(12) United States Patent
Kumar et al.

(10) Patent No.: US 11,580,145 B1
(45) Date of Patent: Feb. 14, 2023

(54) QUERY REPHRASING USING ENCODER NEURAL NETWORK AND DECODER NEURAL NETWORK

(71) Applicant: Amazon Technologies, Inc., Seattle, WA (US)

(72) Inventors: Anjishnu Kumar, Cambridge (GB); Daniele Bonadiman, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 16/141,006

(22) Filed: Sep. 25, 2018

(51) Int. Cl.
*G06F 16/00* (2019.01)
*G06F 16/332* (2019.01)
*G10L 15/16* (2006.01)
*G10L 15/22* (2006.01)
*G06N 3/08* (2023.01)
*G06F 16/33* (2019.01)
*G10L 13/00* (2006.01)

(52) U.S. Cl.
CPC ...... *G06F 16/3329* (2019.01); *G06F 16/3346* (2019.01); *G06F 16/3347* (2019.01); *G06N 3/08* (2013.01); *G10L 13/00* (2013.01); *G10L 15/16* (2013.01); *G10L 15/22* (2013.01); *G10L 2015/223* (2013.01)

(58) Field of Classification Search
CPC combination set(s) only.
See application file for complete search history.

(56) References Cited

U.S. PATENT DOCUMENTS 8,316,237 B1 * 11/2012 Felsher ................. H04L 9/3249
380/282
8,694,449 B2 * 4/2014 Weng ....................... G06N 3/02
706/15
10,332,508 B1 * 6/2019 Hoffmeister ........... G06N 7/005
10,388,274 B1 * 8/2019 Hoffmeister ......... G06N 3/0445
10,445,356 B1 * 10/2019 Mugan ................... G06F 40/30
10,628,432 B2 * 4/2020 Guo ...................... G06N 3/0454
11,016,968 B1 * 5/2021 Hoover .................. G06F 3/167
11,048,702 B1 * 6/2021 Kumar .............. G06F 16/24542
11,055,355 B1 * 7/2021 Monti ............... G06F 16/90332
2010/0312730 A1 * 12/2010 Weng ....................... G06N 3/02
706/15
2012/0005219 A1 * 1/2012 Apacible ............... G06F 16/334
707/768
2017/0270919 A1 * 9/2017 Parthasarathi .......... G10L 25/87
2018/0143978 A1 * 5/2018 Chang ................... G06F 16/243

(Continued)

OTHER PUBLICATIONS

Robin Jia et al.: "Data Recombination for Neural Semantic Parsing", Computer Science Department, Stanford University, Jun. 11, 2016.
Ashish Vaswani et al.: "Attention Is All You Need", 31st Conference on Neural Information Processing Systems (NIPS 2017), Long Beach, CA Dec. 6, 2017.
Orlol Vinyals et al.: "Pointer Networks", Jan. 2, 2017.

(Continued)

*Primary Examiner* — Farhan M Syed
(74) *Attorney, Agent, or Firm* — EIP US LLP

(57) ABSTRACT

A method comprising receiving first data representative of a query. A representation of the query is generated using an encoder neural network and the first data. Words for a rephrased version of the query are selected from a set of words comprising a first subset of words comprising words of the query and a second subset of words comprising words absent from the query. Second data representative of the rephrased version of the query is generated.

20 Claims, 8 Drawing Sheets

(56) References Cited

U.S. PATENT DOCUMENTS

| | | | | |
|---|---|---|---|---|
| 2018/0307687 A1* | 10/2018 | Natkin | ............... | G06F 16/24578 |
| 2018/0330011 A1* | 11/2018 | DeLuca | ............... | G06F 16/9032 |
| 2018/0365220 A1* | 12/2018 | Chakraborty | ........ | G06N 3/0454 |
| 2019/0034795 A1* | 1/2019 | Zitouni | ............. | G06F 16/90335 |
| 2019/0035390 A1* | 1/2019 | Howard | ................... | G10L 15/18 |
| 2019/0057157 A1* | 2/2019 | Mandal | ............... | G06F 16/3329 |
| 2019/0163756 A1* | 5/2019 | Bull | ................... | G06F 16/24535 |
| 2019/0258722 A1* | 8/2019 | Guo | ..................... | G06N 3/0454 |
| 2019/0278857 A1* | 9/2019 | Ni | ........................ | G06N 3/0445 |
| 2019/0384762 A1* | 12/2019 | Hill | ...................... | G06F 16/9535 |
| 2020/0042649 A1* | 2/2020 | Bakis | ...................... | G06F 40/14 |
| 2020/0050949 A1* | 2/2020 | Sundararaman | ...... | G06F 16/285 |
| 2020/0073971 A1* | 3/2020 | Elliott | ................... | H04L 43/045 |
| 2021/0103606 A1* | 4/2021 | Malhotra | ............ | G06F 16/3329 |

OTHER PUBLICATIONS

Dzmitry Bhadanau et al.: "Neural Machine Translation by Jointly Learning to Align and Translate", Published as a conference paper at ICLR 2015, May 19, 2016.

Kyunghyun Cho et al.: "Learning Phrase Representations using RNN Encoder—Decoder for Statistical Machine Translation", Sep. 3, 2014.

Ilya Sutskever et al.: "Sequence to Sequence Learning with Neural Networks", Dec. 14, 2014.

Eric et al.: "A Copy-Augmented Sequence-to-Sequence Architecture Gives Good Performance on Task-Oriented Dialogue"; Computer Science Department, Stanford University, Aug. 14, 2017.

Kevin Frans: "Variational Autoencoders Explained", Aug. 6, 2016 http://kvfrans.com/variational-autoencoders-explained/.

* cited by examiner

QUERY REPHRASING USING ENCODER NEURAL NETWORK AND DECODER NEURAL NETWORK

BACKGROUND

Computer-based query-answering systems can provide answers to queries, which may be submitted by users in the form of text or speech, for example. The effectiveness of such systems for answering queries may be improved by rephrasing queries that these systems are unable to answer, or are unable to answer satisfactorily. However, methods for rephrasing queries may be improved, for example to improve efficiency or speed, or to improve the accuracy of rephrased versions of queries.

DETAILED DESCRIPTION

Figure 1:
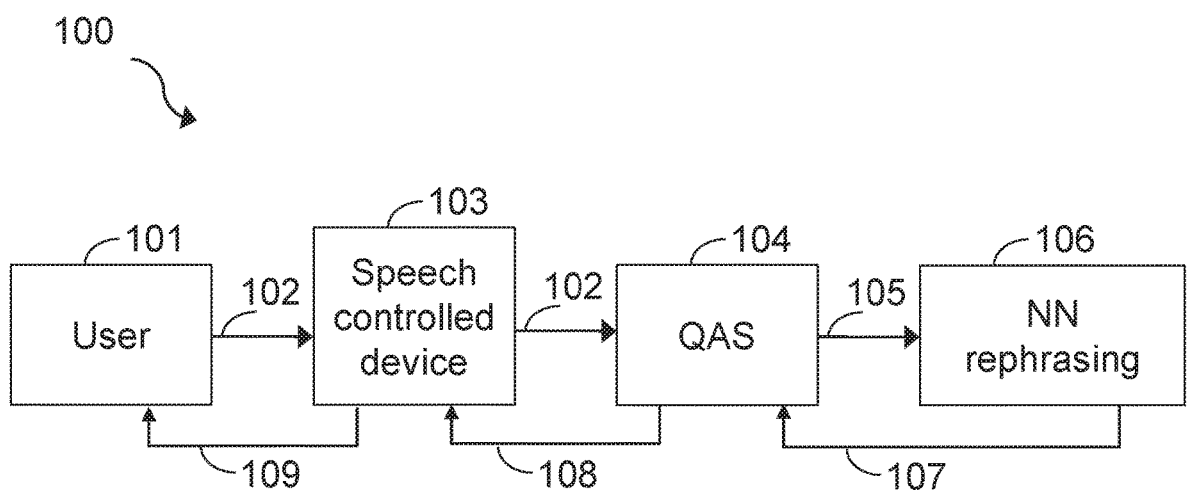
FIG. 1 illustrates schematically an example of a system arranged to provide an answer to a query by rephrasing the query.

Natural language processing (NLP) is a field of computer science, artificial intelligence, and linguistics concerned with the interactions between computers and human languages. Natural language processing can include natural language understanding (NLU), which deals with machine comprehension of words, either spoken or as text, enabling computers to derive meaning from natural language. In some instances, automatic speech recognition (ASR) can be used to generate text data from audio data and used with NLU to provide NLP.

A user may submit a query to a system arranged to perform NLP. In examples herein, a natural language understanding (NLU) system may be used to understand from text data (e.g., typed by a user, generated using automatic speech recognition processing, etc.) that a query is being asked, and what the query is. A data representation of the query may be sent to a query-answering system, which may include a plurality of different query-answering subsystems. However, it is possible that the query-answering system does not include any answers to the query with a confidence level above a threshold confidence level. In other words, the query-answering system may not be able to determine with a sufficient degree of certainty that the answers obtained by the query-answering system do indeed satisfactorily answer the query. For example, the plurality of query-answering subsystems may lack an answer or a satisfactory answer to the query.

This may occur in cases in which a human interacting with such a computer system does not phrase a query in a clear manner. For example, queries may not be grammatically correct or may include extraneous words. This may be the case when queries are received as speech and then converted to text. Such queries may be more informal compared to queries submitted as text and may include repetition or filler words such as "you know" or "like".

In examples herein, a rephrased version of the query may be obtained and resubmitted to the query-answering system, to increase the likelihood of obtaining a satisfactory answer to the query. The interaction between humans and a computer system for providing answers to queries may therefore be improved, allowing such a computer system to more reliably return a satisfactory answer to queries, which may be worded in very different ways. Furthermore, this may improve the coverage of the query-answering system, by increasing the number of queries answerable by the query-answering system.

The rephrased version of the query in examples herein is obtained using an encoder neural network (NN) and a decoder NN, which for example form part of a sequence-to-sequence NN system. Such a system is for example augmented by a copy mechanism, allowing words for the rephrased version of the query to be selected from a set of words including a first set of words including words of the query and a second subset of words including words absent from the query.

The second subset of words may for example include common or frequently used words. Such words may be words which are expected occur with a relatively high rate of incidence in a given input. Words in the second subset of words may for example include some or all of the n most common words in a given language (where n is an integer). Where the system is intended to be used with a particular type of input, such as queries, the second subset of words may include words that appear commonly in relation to this type of input. For example, question words such as "who", "what", "where" and "when" may occur frequently in queries and may therefore be included in the second subset of words in a system which is used to rephrase queries.

The second subset of words in these examples is supplemented by words of the first subset of words, which correspond to words of the query. Hence, the second subset of words may be independent of the query, whereas the first subset of words may depend on the query. In this way, an effectively infinite vocabulary may be used to generate the rephrased version of the query (as there may be an effectively infinite number of different input queries). This may therefore improve the rephrasing of the query, to provide a rephrased query that more accurately captures a meaning of the initial query. In this way, a diverse range of rephrased queries may be generated, rather than merely simplifying an input query.

Use of a copy mechanism to augment the second subset of words with the first subset of words for example increases the vocabulary available to generate the rephrased version of the query without increasing processing time. On this basis, such a system may be more efficient and may be used as part of a low latency system, which is arranged to provide a rapid response to input queries.

FIG. 1 illustrates schematically an example of system 100 arranged to provide an answer to a query by rephrasing the query. It is to be appreciated that certain features of the system 100 of FIG. 1 are simplified or omitted for ease of understanding. A user 101 utters a query 102, which in this example is "Tell me France capital". The query 102 is received by a speech-controlled device 103, which transmits the query 102 for processing by a query-answering system 104, in order to attempt to obtain an answer to the query 102. Although not shown in FIG. 1, it is to be appreciated that the query 102 may be transmitted to the query-answering system 104 via a speech processing system, for example over a network. The speech-controlled device 103 may therefore be considered to capture a spoken utterance including a query 102. Features of the speech-controlled device 103 and a speech processing system that may be used with the system 100 of FIG. 1 are described in detail below with reference to FIGS. 10 and 11.

The query 102 may be processed by a natural language understanding (NLU) system of a speech processing system before being transmitted to the query-answering system 104. An example of a NLU system is discussed in connection with FIGS. 10 and 11. NLU typically allows a structured representation of an input (such as a query) to be generated, which may be referred to as an understanding. Such a representation can be consumed by the query-answering system 104 to generate an answer. However, in other examples, the input may be consumed by the query-answering system 104 without first being processed by an NLU system. An understanding may or may not have internal structure. An understanding may for example represent the meaning of a query as a query over a knowledge base. An NLU subsystem may return confidence data or other metadata indicative of a process used to understand the query (although this is not necessary). In examples, an NLU system may include a plurality of NLU subsystems, which may each use a different approach to obtain a representation of an input. This is described further below with reference to FIGS. 7 and 8.

In the example of FIG. 1, first text data is generated by a speech processing system, and the first text data is transmitted to the query-answering system 104. The first text data represents the spoken utterance including the query 102, and may be generated as explained with reference to FIGS. 10 and 11 (although these are merely examples). The query-answering system 104 may include a plurality of query-answering subsystems, which may each use a different approach in an attempt to obtain an answer to a query. For example, the query-answering system may include a first query-answering subsystem and a second query-answering subsystem, which may be different from the first query-answering subsystem. This is described further below with reference to FIGS. 7 and 9.

In the example of FIG. 1, the query-answering system 104 lacks an answer to the query 102. For example, each of a plurality of query-answering subsystems of the query-answering system 104 may lack an answer to the query 104.

In FIG. 1, an indication is received from the query-answering system 104 that the query-answering system 104 lacks an answer to the query 102. The indication may be in any suitable format which allows other components of the system 100 (such as other components of a speech processing system) to determine that the query-answering system lacks an answer to the query 102. For example, a failure message may be received from the query-answering system 104 indicating that the query-answering system 104 lacks any answer to the query. Alternatively, though, the query-answering system 104 may not send an answer or a failure message, at all or within a predetermined time period. The predetermined time period may be set based on an intended response time for responding to the user with an answer to the query. In such cases, the lack of an answer (or other data) within the predetermined time period may be considered an indication that the query-answering system 104 has not provided any answer within the predetermined time period or that the query-answering system 104 lacks any answer to the query. It may nevertheless be determined, regardless of the exact reason why the query-answering system 104 has failed to respond within the predetermined time period, that the query-answering system 104 lacks an answer to the query.

In other examples, an indication may be received indicating that the query-answering system 104 lacks a satisfactory answer to the query. A satisfactory answer is for example an answer that fulfils the expectations or needs of a user. Answers that are satisfactory may be acceptable or tolerable without being outstanding or perfect. For example, a satisfactory answer may provide sufficient information to answer a query, without providing a large amount of detail. However, satisfactory answers in some cases may be of a high standard or may exceed a user's needs. A satisfactory answer is typically factually correct and may be provided in a timely manner. It may be determined whether a particular answer is a satisfactory answer to a query based on feedback provided by users based on returning that particular answer to the query to the user. If a certain proportion of users provide positive feedback, indicating that that particular answer meets their expectations or needs, the particular answer may be considered to be a satisfactory answer. This is merely an example, though, and other methods may be used to determine whether a particular answer is satisfactory. For example, answers may be classified into satisfactory or unsatisfactory answers using a trained machine learning classifier. Alternatively, answers may be annotated, either by a human or by a computer-based method, as satisfactory or unsatisfactory answers to a given query.

In such cases, an answer to the query 102 from the query-answering system 104 may be received and the indication that the query-answering system 104 lacks a satisfactory answer to the query 102 may be generated in response to determining that the answer is unreliable. This determination may be made in various different ways. For example, the reliability of the answer may be determined based on a query-answering subsystem of the query-answering system 104 which has provided the answer. For example, a first query-answering subsystem may be more reliable than a second query-answering subsystem. In such cases, answers returned by the second query-answering subsystem may be considered unreliable and receipt of answers answered by the second query-answering subsystem may be considered to correspond to obtaining the second indication. In other cases, the reliability of an answer may be determined based on feedback data, which for example represents user feedback. For example, users may have previously provided feedback that a particular answer is not a satisfactory answer to a particular query, in which case that particular answer may be deemed an unreliable answer to that particular query. Alternatively, whether a particular answer is a satisfactory answer to a particular query may be assessed using any of the other methods discussed above, such as using a machine learning classifier or using human or rule-based annotation of answers or any combination of these methods. If the particular answer is determined to be unsatisfactory, the answer may also be considered to be unreliable.

Referring back to the example of FIG. 1, in response to receiving the indication that the query-answering system 104 lacks an answer to the query 102, a rephrased version 107 of the query is generated. In this example, the query-answering system 104 sends first text data 105 representative of the query 102 to a rephrasing system (which may be referred to as a paraphrasing system). However, in other examples, the query-answering system 104 sends the indication to a different component of the system 100, which then triggers or initiates the sending of data corresponding to the query to the rephrasing system. For example, the query-answering system 104 may send the indication to a control system, which then instructs an NLU system to send the data corresponding to the query to the rephrasing system. Such an arrangement is described further with reference to FIGS. 10 and 11.

In the example of FIG. 1, the rephrasing system is a neural network (NN) rephrasing system 106, which generates a rephrased version 107 of the query as explained with reference to FIGS. 2 to 6. A rephrased version of a query is for example a paraphrase of the query, in which words of the query are removed, reordered or replaced, for example. A rephrased version of a query may therefore be considered to be a rewording or other restatement of the query which nevertheless aims to capture the same meaning as that present in the original query. For example, if a query is rephrased correctly, an answer to the rephrased query may be the same as the answer to the initial query.

In this case, the original query 102 is "Tell me France capital". In rephrasing the query 102, the words "Tell me" are removed from the query 102 and replaced with "What is the", and "France capital" is reordered and the word "of" is added to provide the rephrased version 107 of the query, which in this case is "What is the capital of France?". The answer to both the query 102 and the rephrased version 107 of the query in FIG. 1 is the same (namely that the capital of France is Paris). It is to be appreciated that there are typically many different ways in which a query may be rephrased or otherwise reworded. There may therefore be many possible paraphrases or other rephrased versions of a query. Some of these rephrased versions may more accurately or more clearly capture the underlying meaning of the query than others, though.

In the example of FIG. 1, the rephrased version 107 of the query is resubmitted to the query-answering system 104, for example to the plurality of query-answering subsystems which lacked an answer to the initial query. For example, the rephrased version 107 of the query may be sent to the query-answering system 104 in the form of second text data generated by the NN rephrasing system 106. In this example, the query-answering system 104 is able to retrieve a satisfactory answer 108 to the rephrased version 107 of the query, for example from at least one of the query-answering subsystems. The answer may then be returned to the user. In the example of FIG. 1, the query-answering system 104 provides the answer 108 in the form of text data (which may be referred to as answer text data, which represents an answer to the rephrased version of the query), although other data formats are possible. In this example, the answer 108 is converted to audio data 109 (e.g. by a text-to-speech system) before being sent to the speech-controlled device 103. The speech-controlled device 103 then plays the audio represented by the audio data 109 to the user, which includes the answer to the query 102. In this example, the audio includes a person saying "the capital of France is Paris", which is the answer to the query 102.

In examples such as this, a higher success rate for answering a query satisfactorily may be achieved by rephrasing the query. Moreover, systems in accordance with such examples may exhibit reduced sensitivity to the syntax or grammar in queries, which may be non-standard in normal human speech. In this way, such systems may provide improved flexibility for answering queries worded in an unusual manner or with additional or unnecessary words, as may occur during human speech. The interface between users and these systems may therefore be improved, as users may have increased freedom in how queries are worded while maintaining a high success rate for obtaining answers to such queries.

As noted above, the example of FIG. 1 is a simplified example, which aims to illustrate features that may be present in other examples described herein, to put these examples into context. These examples will now be described with reference to FIGS. 2 to 11.

Figure 2:
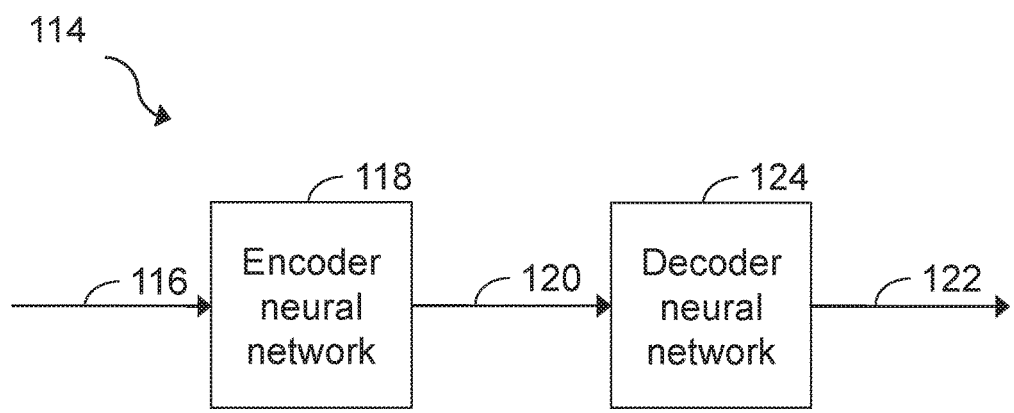
FIG. 2 illustrates schematically an example of a neural network system comprising an encoder neural network and a decoder neural network.

FIG. 2 shows schematically a NN system 114 for use with examples described herein. First data 116 representative of a query is received by an encoder NN 118. The first data 116 is for example derived from an input received from a user, which includes a query that the user seeks an answer to. The first data 116 may in any suitable format for representing a query. For example, the first data 116 may be in the form of text data, which may be in any data format for representing characters (such as letters, numbers, punctuation marks or whitespace), combinations of characters (such as words or parts of words) or combinations or words or parts of words (such as clauses or sentences, or parts thereof). A data format, sometimes referred to as a format, type or data type, is for example a classification of data, which for example indicates to a compiler or interpreter how data of a particular format is to be used. Common data types include integers, Booleans, characters, floating-point numbers (sometimes referred to as floats) and strings. In other examples, a data format may be considered to correspond to a file format, which typically refers to a standardized way (which may be proprietary or open-source) of encoding data for storage in a computer file, or a data storage format such as a particular structure such as a database or table. A character or a string may each be used to represent text. The first data 116 may therefore include at least one character and/or string. In such cases, the first data 116 may be input as a text-based query, for example via a graphical user interface (GUI) via which a user can enter a text-based query (represented by the first data 116 in the form of text data). Alternatively, the first data 116 may be converted to text data from a different data format. For example, in FIG. 1, the user asks a query orally, as an utterance captured by a speech-controlled device 106. The utterance is then converted to text data as the first data 116.

Before the first data 116 is processed by the NN system 114, it may be determined that the first data 116 is representative of a query. Such a determination may include processing of the first data 116 by an NLU system (such as that described further below with reference to FIG. 7 to determine an intent of the first data 116. In this way, it may be determined that the first data 116 represents a query. This is merely an example, though, and other methods for identifying that the first data 116 is representative of a query may be used in other cases. For example, it may be determined that the first data 116 represents a query by an input method used by a user to submit the query. For example, the input method may be used to set a flag, which for example represents a Boolean value of 0 or 1 indicating whether an input is not a query or is a query. For example, if the query is entered via a particular graphical element (such as a search bar) of a GUI, the flag may be set to 1, to indicate that the input represents a query. In yet further cases, determination of whether the first data 116 represents a query may be omitted. In such cases, it may be assumed that all natural language inputs (regardless of data format, such as text or audio) include a query.

In the example of FIG. 2, a representation 120 of the query is generated using the encoder NN 118 and the first data 116. A representation 120 of the query for example represents the query in a different data format than the first data 116, which may be processed efficiently. The encoder NN 118 may therefore be considered to encode the query into a suitable representation for subsequent processing. The first data 116 may be compressed by the encoder NN 118 to generate a representation 120 of the query with a lower dimensionality than the first data 116. As an illustrative example, if a query includes words selected from a dictionary of n words, each of these n words may be represented using one-hot encoding by a vector with a dimensionality of n (where n is an integer). For example, if the first word of the dictionary is "cat" and the second word of the dictionary is "dog", the word "cat" may be represented by the vector $x_1=[1, 0, 0, \ldots, 0]$, and the word "dog" may be represented by the vector $x_2=[1, 0, 0, \ldots, 0]$, where $x_1$ and $x_2$ each have a dimensionality of n.

Using the encoder NN 118, words of the query may be represented using vectors with a dimensionality of m, where m is an integer and m<n. For example, the representation 120 may be of a fixed or constant size, such as a vector of a fixed length (which may be referred to as a dimensionality of the vector). For example, the words of the query may be represented using a dense vector, rather than a sparse vector such as a one-hot vector, which is for example a vector obtained using one-hot encoding, as described above. A dense vector may for example have a relatively small dimensionality compared to the number of possible words in a given language (such as 300). In such case, each element of a dense vector may include a floating point value (which may represent a non-integer value). In contrast, a sparse vector may have a larger dimensionality than a dense vector, and include a plurality of elements each including an integer or Boolean value. The representation 120 may be of a smaller data size than the first data 116. In this way, the query may be represented more efficiently by the representation 120 generated by the encoder NN 118. However, this is merely an example, and other data formats may be used as the representation 120 in other examples. For example, in some cases, the representation 120 generated by the encoder NN 118 may be a sparse vector. In other cases, a word of the query may be represented by applying a function to respective characters of each word. In this way, each character may be represented as a vector. In such cases, the word may be represented as a vector of vectors, which may be considered to be a tensor, representable as a multidimensional array. Representing a word as a tensor may be useful in morphologically rich languages, in which grammatical relations may be indicated by changes to words rather than a change in position of words or the addition of extra words.

Second data 122 representative of a rephrased version of the query is generated using a decoder NN 124 and the representation 120 of the query. The encoder NN 118 and the decoder NN 124 for example form a sequence-to-sequence NN system. In such cases, the encoder NN 118 is trained to encode an input sequence (in this case, the query). The decoder NN 124 is trained to decode the representation 120 of the input sequence to generate a target sequence (in this case, the rephrased version of the query). The second data 122 may for example be in the same data format as the first data 116 (such as text data), or in a different format. In such examples, the encoder NN 118 and the decoder NN 124 may be considered to form an encoder and decoder pair, which may be referred to as an autoencoder. Such an autoencoder may be trained in an unsupervised manner, for example using unlabeled training data, which may simplify the training process.

A NN, such as the encoder NN 118 or the decoder NN 124, typically includes a number of interconnected neurons, which may be referred to as artificial neurons or nodes. The internal state of a neuron (sometimes referred to as the activation) typically depends on an input received by the neuron. The output of the neuron then depends on the input and the activation. The output of some neurons is connected to the input of other neurons, forming a directed, weighted graph in which edges (corresponding to connections from an output of one neuron to an input of another neuron) or vertices (corresponding to neurons) of the graph are associated with weights, respectively. The weights may be adjusted throughout training, altering the output of individual neurons and hence of the NN as a whole. In examples herein, references to a NN refer to an artificial neural network (ANN), which is a computer-based system that may be used to learn to perform specific tasks.

Various different NNs may be used for the NN system 114 in examples such as FIG. 2. Typically, such NNs are recurrent NNs (referred to as RNNs) (although other NNs may be used in other examples). RNNs perform the same task for each element of a sequence (such as for each word of a sequence of words, such as a sequence of words corresponding to a query). For example, the parameters of such an NN may be unchanged across a plurality of elements of the sequence. The task in FIG. 2 is prediction of words of a rephrased version of a query. These words may be predicted sequentially, for example one word at a time. However, the task as a whole remains unchanged, irrespective of the number of words of the rephrased query that have been predicted.

Despite repeated performance of the same task, the RNN will typically sequentially output different respective elements. For example, an RNN (such as the decoder NN 124) may output a rephrased query on a word-by-word basis, so that the rephrased query as a whole includes various different words, to form a phrase that makes sense linguistically. However, each output element (e.g. each output word predicted by the decoder NN 124) typically depends on previous calculations. This accounts for the fact that, in a typical query, a word will generally depend on the words preceding it. A detailed explanation of example RNNs that may be used for the encoder NN 118 and the decoder NN 124 is provided with reference to FIGS. 3 to 6.

In the example of FIG. 2, words are selected for the rephrased version of the query from a set of words including a first subset of words including words of the query and a second subset of words including words absent from the query. The second subset of words for example includes common words, which may be expected to occur frequently in various different queries, irrespective of the topic of the query. The second subset of words may therefore be independent of the query and the same second subset of words may be used for a plurality of different queries. However, as the first subset of words includes words of the query, the first subset of words may include fewer common words, which may be specific or related to the topic of the query itself. The first subset of words may therefore depend on the query. In this way, the first subset of words may be used to augment the set of words, so that the set of words from which the rephrased query is formed may be more likely to include relevant words. This may therefore improve the accuracy of the rephrased version of the query, so that it more accurately captures the meaning of the query.

Furthermore, the number of words in the second subset of words may be reduced compared to other examples in which the set of words does not include words of the query. For example, rare or infrequently used words (which may appear in a query) need not form part of the second subset of words (which is for example independent of the query). This may reduce the amount of processing to predict the rephrased version of the query.

In order to select words for the rephrased version of the query from the set of words including the first and second subsets, the NN system 114 may use a copy mechanism, as described with reference to FIGS. 3 to 6. Such a copy mechanism may for example be an attention-based copy mechanism, involving the use of an attention mechanism. An attention mechanism may capture an alignment between a part of an input sequence (such as the input query) and a corresponding part of an output sequence (such as a predicted word for the rephrased version of the query). An alignment for example represents how well these parts of the input and output sequences match each other. If particular parts of an input and output sequence are well aligned, an element of the input sequence (such as a word) may be copied to form part of the output sequence. Such an element may for example be considered to be a word of the first subset of words. In this way, a word for the rephrased version of the query may be selected from the first subset of words rather than from the second subset of words.

Figure 3:
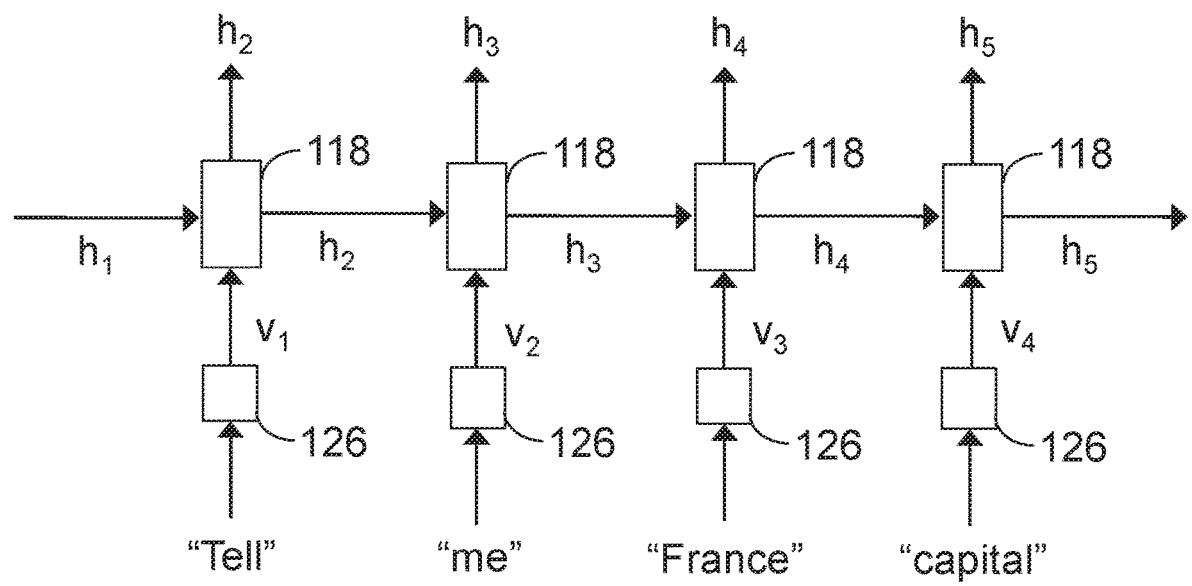
FIG. 3 illustrates schematically an encoder neural network according to examples.

An illustrative example of an encoder NN 118, which may be used with the NN system 114 of FIG. 2, is shown in FIG. 3. The encoder NN 118 of FIG. 3 is an encoder long short-term memory (LSTM) NN, which is an example of a RNN. Other NNs, such as other RNNs, may be used in other examples, though. For example, a different RNN, such as a bi-directional RNN, or a transformer encoder may be used instead. An LSTM NN may be used to learn long-term dependencies. In this way, context from an earlier part of a sentence may be used by an LSTM NN to predict a word in a later part of the sentence. A simple RNN may use a single layer, in which a single function (such as the tanh function) is applied to an input to obtain an output. An LSTM NN typically has a more complex structure, which includes a plurality of layers. In general, an LSTM NN includes what may be referred to as a "cell", which stores an input. An LSTM unit of an LSTM NN typically also includes a so-called "input gate", a so-called "output gate" and a so-called "forget gate". An input gate for example controls the extent to which a new value flows into the cell, the output gate controls the extent to which the value in the cell is used to compute an output activation of an LSTM unit, and the forget gate controls the extent to which a value remains in the cell. A series of LSTM units for example form an LSTM NN, or an LSTM NN may include solely one LSTM unit. It is to be appreciated that there are many variants or versions of LSTM NNs, and any of these may be used with the examples herein.

In FIG. 3, the first data 116 represents the query "Tell me France capital". This query may be considered to correspond to an input sequence of words. Each word from the input sequence is associated 126 with a corresponding vector. The word "Tell" is associated with a first vector $v_1$, the word "me" is associated with a second vector $v_2$, the word "France" is associated with a third vector $v_3$, and the word "capital" is associated with a fourth vector $v_4$. The association 126 between the words of the query and corresponding vectors may be performed using any suitable method. For example, a word embedding process may be used. There are various different word embedding processes that may be used, as the skilled person will appreciate, including those based on a continuous bag of words model or a skip-gram model. A machine learning model may be used to perform the word embedding process. For example, a Siamese neural network may be trained to associate similar words to similar vectors in the vector space. In other examples, a lookup table may be used to associate 126 an input word with a corresponding vector. Each word may be associated with a corresponding vector of a fixed or constant size, or different words may be associated with corresponding vectors of different respective sizes.

The encoder NN 118 of FIG. 3 could be illustrated with a loop showing an output of the encoder NN 118 being received as an input to the encoder NN 118, in a recursive fashion. However, FIG. 3 illustrates the encoder NN 118 in an unrolled fashion, to more clearly illustrate the processing being performed by this example encoder NN 118.

The encoder NN 118 receives the first vector $v_1$ as an input. In the example of FIG. 3, the encoder NN 118 also receives a first hidden state $h_1$ as an input, which may be considered to be an initial hidden state. Such an initial hidden state may be initialized to a predetermined value, such as a null or zero value. The first hidden state $h_1$ may be considered to represent a hidden state of the encoder NN 118 at a first time, which is for example prior to processing the query. A time in this context may be considered to refer to a time at which a given number of elements of an input sequence of elements has been processed. In this case, the first time is a time at which no elements (in this case, no words) of the query have been processed by the encoder NN 118.

In other examples, an initial hidden state may be omitted. In such cases, the encoder NN 118 may be configured to use a default or preset hidden state, along with the first vector $v_1$, to calculate an output (e.g. if no input hidden state is received by the encoder NN 118).

In FIG. 3, the encoder NN 118 processes the first hidden state $h_1$ and the first word of the query. In this example, the first word of the query (the word "Tell") is processed by processing the first vector $v_1$ representing the first word of the query. The processing performed by the encoder NN 118 computes a second hidden state $h_2$ of the encoder NN 118 at a second time. In this case, the second time is a time at which the first element (in this case, the first word) of the query has been processed by the encoder NN 118.

A hidden state h of the encoder NN 118 for example represents a memory of the NN. Typically, a hidden state h of the encoder NN 118 depends on the previous hidden state and an input at a current time. This may be expressed mathematically, for an input query represented as a series of vectors $v=(v_1, \ldots, v_T)$, as:

$$h_t = f(v_t, h_{t-1})$$

where h is the hidden state of the encoder NN 118 at a given time t and $f$ is a function (which is typically a nonlinear function).

Hence, the second word of the query (represented by the second vector $v_2$) and the second hidden state $h_2$ of the encoder NN 118 are subsequently processed using the encoder NN 118 to compute a third hidden state $h_3$ of the encoder NN 118. This process continues, as shown in FIG. 3, to sequentially generate the fourth and fifth hidden states $h_4$, $h_5$ of the encoder NN 118.

In the example of FIG. 3, a final output hidden state of the encoder NN 118 (which is for example the hidden state output by the encoder NN 118 after processing the last word of the query, and which in this case is the fifth hidden state $h_5$) is output for subsequent processing by the decoder NN 124. The output hidden state may be considered to capture features of the sequence as whole (and therefore of the query) and may subsequently be decoded to generate a rephrased version of the query. In examples, this output hidden state may be taken as a representation of the query, which may be sent to the decoder NN 124. In other examples, the output hidden state may undergo further processing before being sent to the decoder NN 124 as the representation of the query. The output hidden state is typically in the form of a vector. Hence, an encoder NN 118 such as that of FIG. 3 may be used to generate a vector representation of the query.

Figure 4:
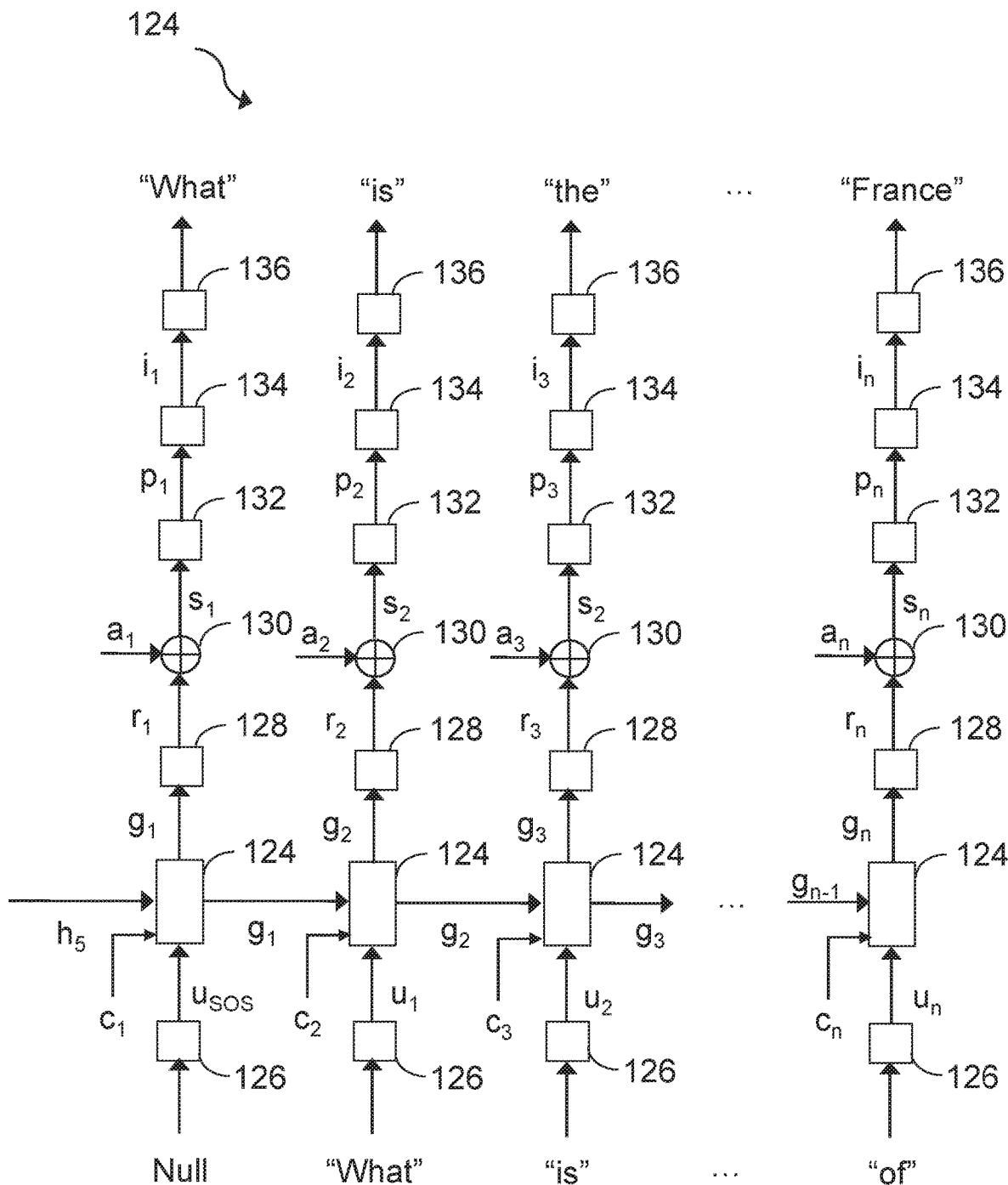
FIG. 4 illustrates schematically a decoder neural network according to examples.

FIG. 4 illustrates an example of a decoder NN 124 that may be used with the NN system 114 of FIG. 2, and hence with the encoder NN 118 of FIG. 3. The decoder NN 124 of FIG. 4 receives the representation of the query, which in this example is the fourth hidden state $h_5$ of the encoder NN 118. In this example, the decoder NN 124 is also an LSTM NN. The decoder NN 124 may be of the same or a similar NN type as the encoder NN 118, but trained to decode a representation of a query to generate a rephrased version of a query, rather than to encode a query to generate the representation of the query. Hence, while the structure of the encoder NN 118 and the decoder NN 124 may be the same as or similar to each other, the parameters associated with the encoder NN 118 and the decoder NN 124 will typically differ, so as to perform different respective tasks. In other examples, the encoder NN 118 and the decoder NN 124 have different structures from other.

In addition to the representation of the query, the decoder NN 124 of FIG. 4 also receives, at each time, an input representing the previously predicted word of the rephrased version of the query. The example of FIG. 4 includes associating 126 the previously predicted word of the rephrased version of the query with a corresponding vector, $u_{SOS}$, $u_1$, $u_2$, . . . , $u_n$. This association 126 may be performed similarly to or using the same method as the associating 126 of FIG. 3.

At a first time, no words of the rephrased version of the query have been predicted yet. Hence, at this time, a start of sequence token may be received as an input to the decoder NN 124. A token is for example a character, string or other data type that may be used to represent a given concept or characteristic relating to a sequence of words, such as the start of a sequence or the end of a sequence. The start of sequence token may be any suitable token that indicates the start of the rephrased version of the query. A token may be considered to be suitable where it differs from other words from a vocabulary from which the query and the rephrased version of the query may be formed. This allows the token to be distinguished from words of the query or the rephrased version of the query. For example, the start of sequence token may be a control character, such as a null character with a value of zero. In some cases, the start of sequence token may be a learned token, character or value, which is learnt during training of the NN system 114. The start of sequence token may be in the form of a start of sequence vector, $u_{SOS}$, which may be generated from a null input. For example, the null input may be associated 126 with the start of sequence vector, $u_{SOS}$, to be input to the decoder NN 124 using the same association 126 as described with reference to the encoder NN 118.

In the example of FIG. 4, the decoder NN 124 also receives a context vector, $c_1$, in addition to receiving the start of sequence vector $u_{SOS}$ and the representation of the query (in this case, the fourth hidden state $h_5$ of the encoder NN 118). A context vector generally aims to capture context in a sequence of words, and may be used to implement an attention mechanism. An attention mechanism for example allows more relevant, interesting or important words of a sentence or phrase to be identified, and focused on to a greater extent than other, less interesting words (such as common words). By inputting the context vector, $c_1$, to the decoder NN 124, in conjunction with the start of sequence vector $u_{SOS}$ and the representation of the query, the accuracy of the decoder NN 124 in correctly predicting the next work in the rephrased version of the query may be increased. For example, the first hidden state of the decoder NN 124 depends on the representation of the query (which in this case is the fourth hidden state $h_5$ of the encoder NN 118). The first word of the rephrased version of the query (after the start of sequence token) may be more likely to be similar to or the same as the first word of the query (rather than the last word of the query). However, the fourth hidden state $h_5$ of the encoder NN 118 is four steps removed from the second hidden state $h_2$ of the encoder NN 118, which is obtained by processing the first word of the query. Hence, as the length of the input query increases, the likelihood that the first word of the rephrased version of the query is correctly predicted by the decoder NN 124 may decrease, as the correlation between the representation of the query input to the decoder NN 124 and the hidden state of the encoder NN 118 corresponding to the first word of the query may also decrease. The attention mechanism attempts to compensate for this, by allowing the decoder NN 124 to attend to or focus on different parts of the query as each word of the rephrased version of the query is predicted. This for example allows the decoder NN 124 to more accurately identify an appropriate word of the query for a rephrased version of the query, regardless of the position of the word in the query. A context vector that depends on a plurality of different hidden states of the encoder NN 118, rather than merely the final hidden state of the encoder NN 118, may be used to implement such an attention mechanism. A context vector may be generated as described with reference to FIG. 6.

The context vector, $c_1$, the start of sequence vector $u_{SOS}$ and the representation of the query (in this case, the fourth hidden state $h_5$ of the encoder NN 118) are processed by the decoder NN 124 to compute a first hidden state, $g_1$, of the decoder NN 124. Similarly to the encoder NN 118, the hidden state g of the decoder NN 124 depends on the previous hidden state (or the output hidden state of the encoder NN 118 for the first iteration) and an input at a current time. This may be expressed mathematically, for a predicted rephrased version of the query represented as a series of vectors $u=(u_1, \ldots, u_T)$, as:

$$g_t = f'(u_t, g_{t-1}, c_t)$$

where g is the hidden state of the decoder NN 124 at a given time t, $f'$ is a function (which is typically a nonlinear function) and c is the context vector. $f'$ may be of the same format as the function $f$ associated with the encoder NN 118, but typically includes different parameters so as to implement a different task. It is to be noted, though, that in some cases, the calculation of the context vector may be omitted. In such cases, the hidden state of the decoder NN 124 may instead be calculated using the following formula:

$$g_t = f'(u_t, g_{t-1})$$

where g is the hidden state of the decoder NN 124 at a given time t, f' is a function (which is typically a nonlinear function) and the predicted rephrased version of the query may be represented as a series of vectors $u=(u_1, \ldots, u_T)$.

In this example, the first hidden state, $g_1$, of the decoder NN 124 is representable as a hidden state vector with a first dimensionality. A dimensionality of a vector for example indicates the number of elements of that vector. For example, a vector with three elements may be considered to have a dimensionality of three. In FIG. 4, item 128 involves changing a dimensionality of the hidden state vector (which in this case is associated with the first hidden state, $g_1$, of the decoder NN 124). Changing the dimensionality of the hidden state vector in this way may be used to generate a first score vector, $r_1$, with a second dimensionality equal to a number of words in the second subset of words. The dimensionality may be changed using any suitable dimensionality adjustment function (typically a dimensionality reduction function, although in some cases the dimensionality may instead be increased). For example, the hidden state vector may be processed using a projection matrix to project the hidden state vector to a space with a dimensionality equal to the intended dimensionality of the first score vector, $r_1$. In other cases, a trained neural network or other machine learning system may be used to change a dimensionality of the hidden state vector to obtain the first score vector, $r_1$. In this way, each element of the first score vector, $r_1$, may be taken to correspond to a different respective word of the second subset of words. For example, an element of a score vector (such as the first score vector, $r_1$) may be taken as a score associated with a word of the second subset of words (which may be referred to as a second score associated with a second word of the second subset of words). Similarly, a different element of the first score vector, $r_1$, may be taken as a score associated with a different word of the second subset of words, and so on. In other words, there may be a one-to-one correspondence between elements of a score vector and words of the second subset of words. This may facilitate the selection of a subsequent word for the rephrased version of the query, as will be explained further with reference to FIG. 5.

In the example of FIG. 4, the first score vector, $r_1$, is combined with a first attention vector, $a_1$, which for example indicates a degree of alignment between a word at a current position in the predicted rephrased version of the query and a word of the query. The first attention vector, $a_1$, in this example is generated using an attention mechanism that uses a current hidden state of the decoder NN 124 (in this case, the first hidden state $g_1$) and at least one hidden state of the encoder NN 118. A description of an example of generation of an attention vector is provided with reference to FIG. 6.

Elements of the first score vector, $r_1$, and the first attention vector, $a_1$, may be considered to represent respective scores associated with different respective words of the set of words. For example, each element of the first attention vector, $a_1$, may be taken as a respective score associated with a respective word of the first subset of words. For example, the first attention vector, $a_1$, may include a number of elements which is equal to the number of words in the first subset of words, with a one-to-one mapping between a word of the first subset of words and an element of the first attention vector, $a_1$. This is merely an example, though, and other examples may differ. For example, there may be fewer elements of the first attention vector, $a_1$, than the number of words in the first subset of words. For example, the first attention vector, $a_1$, may include elements corresponding to the n words of the first subset of words with a highest respective element value, to reduce storage requirements for storage of the first attention vector, $a_1$. As explained above, the first attention vector, $a_1$, may be generated using an attention mechanism. Hence, a first score associated with a first word of the first subset of words (which for example corresponds with a first element of the first attention vector, $a_1$) may be generated using an attention mechanism.

Similarly, each element of the first score vector, $r_1$, may be taken as a respective score associated with a word of the second subset of words. For example, the first score vector, $r_1$, may include a second element associated with a second word of the second subset of words. In this way, methods such as those described herein with reference to FIGS. 2 to 6 may be used to generate a first score associated with a first word of the first subset of words, using an encoder NN (such as the encoder NN 118 of FIG. 3), a decoder NN (such as the decoder NN 124 of FIG. 4) and the representation of the query (in this example, the fifth hidden state $h_5$ of the encoder NN 118). Such methods may also be used to generate a second score associated with a second word of the second subset of words, using the decoder NN and the representation of the query.

Scores such as this may be used to select words for the rephrased version of the query. For example, a score (which corresponds to an element of the first score vector, $r_1$, or the first attention vector, $a_1$) may be considered to indicate a likelihood that the word corresponding to that score is the correct next word in the rephrased version of the query. Hence, one of the first word of the first subset of words or the second word of the second subset of words may be selected for the rephrased version of the query based on at least one of the first score or the second score. For example, the first and second scores may be compared with each other to determine which has the larger magnitude. The word corresponding to the score of the larger magnitude may be selected as the next word in the rephrased version of the query. It is to be appreciated that a similar method may be performed with a plurality of scores, to select a word corresponding to a score of the largest magnitude as the rephrased version of the query. As the scores may be associated with words from either the first or second subset of words, the next word for the rephrased version of the query may be selected from either the first or second subset of words.

In the example of FIG. 4, the first attention vector, $a_1$, is combined with the first score vector, $r_1$ (although this need not be the case). The first attention vector, $a_1$, and the first score vector, $r_1$, may be combined using any suitable method for combining two vectors. Typically, though, the first attention vector, $a_1$, and the first score vector, $r_1$, are concatenated so as to preserve the individual elements of the first attention vector, $a_1$, and the first score vector, $r_1$, which for example correspond, respectively, to scores associated with a word of the first or second subset of words. In this way, a combined score vector, $s_1$, may be generated (which in this example is a first combined score vector, $s_1$, as it is based on the first hidden state, $g_1$, of the decoder NN 124).

At item 132 of FIG. 4, the first and second scores (which are for example elements of the first attention vector, $a_1$, and the first score vector, $r_1$, respectively) are normalized. For example, the first score may be normalized to generate a normalized first score and the second score may be normalized to generate a normalized second score. The normalization in this example is such that a sum of a set of normalized scores comprising the normalized first score and the normalized second score corresponds to a predetermined value. The set of normalized scores for example includes normalized scores corresponding to respective words of the set of words from which the words of the rephrased version of the query is selected. In this example, the normalization is performed such that the set of normalized scores represents a set of probability values representing a probability or other likelihood that a word corresponding with a given normalized score is the correct subsequent word in the rephrased version of the query. Hence, in such cases, the predetermined value is 1, so that the sum of each of the individual normalized scores of the set of normalized scores is equal to 1.

As the first attention vector, $a_1$, and the first score vector, $r_1$, are combined in the example of FIG. 4 (to generate the combined score vector, $s_1$), the normalization may be performed by processing the combined score vector, $s_1$, rather than the first attention vector, $a_1$, and the first score vector, $r_1$, individually (although this need not be the case). In FIG. 4, a probability vector, $p_1$, is generated using the first combined score vector, $s_1$, and a normalization function. The probability vector, $p_1$, in this case is a first probability vector, $p_1$, as it is based on the first hidden state, $g_1$, of the decoder NN 124. A suitable normalization function is the softmax function, which maps an n-dimensional vector of real values to an n-dimensional vector of real values in the range from 0 to 1. This may be summarized mathematically as:

$$\sigma : \mathbb{R}^K \to \left\{ \sigma \in \mathbb{R}^K \mid \sigma_i > 0, \sum_{i=1}^{K} \sigma_i = 1 \right\}$$

$$\sigma(z)_j = \frac{e^{z_j}}{\sum_{k=1}^{K} e^{z_k}}, \quad j = 1, \ldots, K$$

where a K-dimensional vector of real values is mapped to a K-dimensional vector $\sigma(z)$ of real values, each in the range of (0, 1), and such that all the values of the vector $\sigma(z)$ add up to 1. As the skilled person will appreciate, $\mathbb{R}^K$ indicates a set of all real-valued tuples with K-dimensions. However, other normalization functions may be used in other examples.

In examples such as this, the amount of data to be normalized depends on a size of the combined score vector, $s_1$, which in this example depends on the number of words in the set of words from which words of the rephrased version of the query are selected. Hence, increasing the number of words from which words of the rephrased version of the query are selected (which may be considered to correspond to an output vocabulary for the rephrased version of the query) typically increases a time taken to perform this normalization. However, using the first subset of words to supplement the second subset of words allows words specific to the query at hand (which may be relatively rare) to be included in the output vocabulary without unduly increasing a size of the output vocabulary (which may be otherwise be performed to ensure that the output vocabulary includes a sufficiently large and diverse set of words so as to accurately capture a meaning of a wide range of input queries). Hence, the total number in the set of words may be relatively small without unduly affecting an accuracy of the rephrasing of the query. In this way, methods such as those described herein may be used to rephrase a query more rapidly or more efficiently than other cases in which words of a rephrased version of a query are selected from a larger output vocabulary.

The first probability vector, $p_1$, includes probability values indicative of respective probabilities that corresponding words are a subsequent word in the rephrased version of the query. Each probability value for example is a respective element of the first probability vector, $p_1$. The first probability vector, $p_1$, in FIG. 4 therefore includes a first probability value indicative of a first probability that the first word is a subsequent word in the rephrased version of the query and a second probability value indicative of a second probability that the second word is the subsequent word in the rephrased version of the query.

Normalized scores (such as the normalized first score or the normalized second score), which may be in the form of a probability vector such as the first probability vector, $p_1$, are used to select a subsequent word for the rephrased version of the query at item 134 of FIG. 4. For example, if it is determined that a first magnitude of the normalized first score is greater than a second magnitude of the normalized second score, the first word of the first subset of words may be selected as a subsequent word for the rephrased version of the query. Conversely, if it is determined that the second magnitude of the normalized second score is greater than the first magnitude of the normalized first score, the second word of the second subset of words may be selected as a subsequent word for the rephrased version of the query. Where the normalized scores represent probability values, such probability values may be used in a similar manner to select a subsequent word for the rephrased version of the query. For example, if it is determined that a first magnitude of the first probability value is greater than a second magnitude of the second probability value, the first word of the first subset of words may be selected as the subsequent word for the rephrased version of the query. Conversely, if it is determined that a second magnitude of the first probability value is greater than a first magnitude of the second probability value, the second word of the second subset of words may be selected as the subsequent word for the rephrased version of the query.

Selecting a word of the subset of words for the subsequent word of the rephrased version of the query may include identifying an index of that word. For example, each word of the subset of words may be labelled with an index, e.g. from 0 to n−1, where there are n words in the subset of words. The probability values in a probability vector (or the normalized scores) may be arranged in an order to allow the word corresponding to a particular probability value or normalized score to be easily identified. For example, the first element of the probability vector may correspond with the word with the first index, and so on.

After selecting the word which is to be used as the subsequent word of the rephrased version of the query, a portion of second data (representative of the word) may be generated at item 136 of FIG. 4. This may include copying a portion of the first data representative of the word in the query to generate the portion of the second data representative of the word in the rephrased version of the query. Such copying may be performed where it is determined that the word to be used as the subsequent word of the rephrased version of the query belongs to the first subset of words, and is therefore a word of the query to be rephrased. Hence, methods such as that of FIG. 4 may be considered to include a copy mechanism, in that words of the query may be copied to form words of the rephrased version of the query.

In other examples, the portion of the second data, which represents the subsequent word of the rephrased version of the query, may be generated by obtaining data representative of a word of the second subset of words (which are absent from the query) and using this data as the portion of the second data. Such data may be obtained based on the index of the word of the subset of words, which may be identified at item 134 of FIG. 4. For example, data representative of a word of the second subset of words may be stored in any suitable data format, such as a lookup table, and retrieved from the lookup table as the portion of the second data, if the word of the second subset of words is selected as the subsequent word of the rephrased version of the query.

Figure 5:
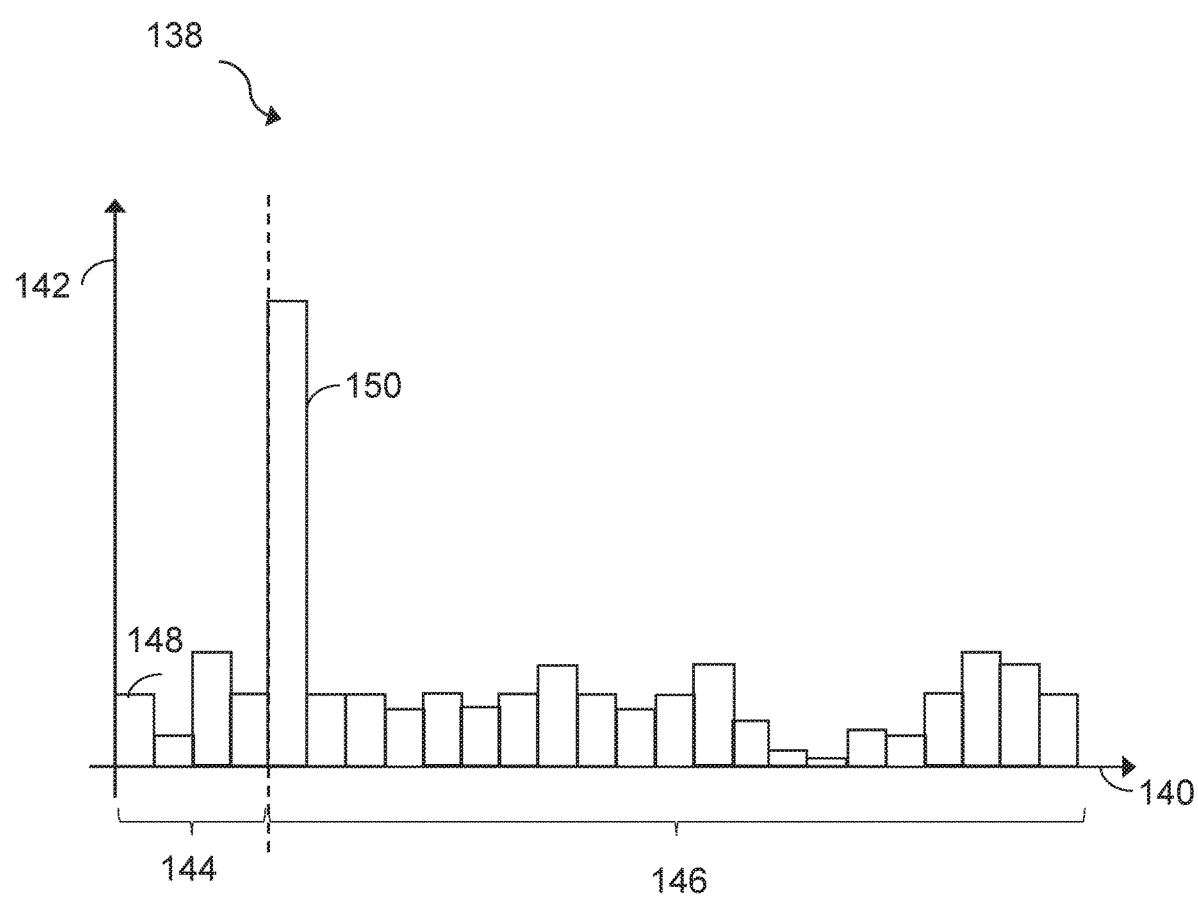
FIG. 5 is a plot showing schematically an example of probability values obtainable using a decoder neural network according to examples.

An example plot 138 of probability values is shown schematically in FIG. 5. FIG. 5 represents the first probability vector, $p_1$, of FIG. 4 in graph form. An x-axis 140 of the plot 138 represents an element of the first probability vector, $p_1$, and corresponds with an index of a word of the set of words. A y-axis 142 of the plot 138 represents a probability value. A first set 144 of elements of the first probability vector, $p_1$, correspond respectively with words of the first set of words, which are words of the query. A second set 146 of elements of the first probability vector, $p_1$, correspond respectively with words of the second set of words, which are words absent from the query.

In the example of FIG. 5, a first probability value 148 associated with a first word of the first subset of words is less than a second probability value 150 associated with a second word of the second subset of words. In this case, the second probability value 150 is the largest of the probability values of the first probability vector, $p_1$. On this basis, the second word (associated with the second probability value 150) is selected as the word for the rephrased version of the query.

In this example, the second word is the word "what", which is absent from the query of "Tell me France capital". The word "what" is, however, a common word, which in this example is included in the second subset of words and hence is available for selection for the rephrased version of the query.

After selecting the word "what" as the first word of the rephrased version of the query, the method of FIG. 4 repeats. The first word of the rephrased version of the query is associated 126 with a first vector, $u_1$. Then, rather than processing the representation of the query and the start of sequence vector, $u_{SOS}$, using the decoder NN 124, the decoder NN 124 instead processes the first hidden state, $g_1$, of the decoder NN 124, the first word of the rephrased version of the query (by processing the first vector, $u_1$) and a second context vector, $c_2$, to compute a second hidden state, $g_2$, of the decoder NN 124. Similarly to the first hidden state, $g_1$, of the decoder NN 124, the second hidden state, $g_2$, of the decoder NN 124 is representable as a hidden state vector with a first dimensionality (which may be the same as or different from a dimensionality of a hidden state vector representation of the first hidden state, $g_1$). The dimensionality of the hidden state vector is changed at item 128 to generate a score vector (in this case, a second score vector, $r_2$) with a second dimensionality equal to the number of words in the second subset of words. An element of the second score vector, $r_2$, may be used as a second score associated with a second word of the second subset of words. In such case, the dimensionality of the first and second score vectors, $r_1$, $r_2$, may be the same as each other. However, the elements of these vectors (which represent respective scores) may differ from each other, as the likelihood of a given word being a subsequent word in the rephrased version of the query typically varies at different points in the rephrased version of the query, depending on the previous words of the rephrased version of the query.

The second score vector, $r_2$, is combined with a second attention vector, $a_2$, at item 130 and a second probability vector, $p_2$, is calculated at item 132. From the second probability vector, $r_2$, a subsequent word for the rephrased version of the query is selected, at item 134, and a portion of second data is generated at item 136. In this example, the subsequent word is "is", which also belongs to the second subset of words.

This method is performed repeatedly to generate the rephrased version of the query as "What is the capital of France". Some elements of this method are omitted from FIG. 4 from clarity. In this example, the words "What", "is", "the" and "of" are selected from the second subset of words, whereas the words "capital" and "France" are selected from the first subset of words. However, this is merely an illustrative example.

As can be seen, in examples such as this, the query and the rephrased version of the query are in the same language as each other (English, in this example). Hence, methods such as this may be used to rephrase a query without translating the query into a different language. A language is for example a natural language, which has arisen naturally through human use. Alternatively, a language may be a constructed or artificial language, such as Esperanto, which has been devised for communication. For example, in some cases a language of the query may be determined, for example based on metadata associated with data representative of the query, or based on NLU applied to the query. Then, the words for the rephrased version of the query may be selected from the set of words which are in the language of the query. In such cases, the set of words may include words of a single language only. For example, there may be different sets of words (such as a different second subset of words) in each of a plurality of different languages. In such cases, the set of words (or the second subset of words) in a language which is the same as the language of the query may be selected for use with the methods herein. In other cases, though, the set of words (such as the second subset of words) may include words in various different languages. In such cases, the words for the rephrased version of the query may be selected from those words of the set of words that are in the same language as the language of the query.

In examples, such as that of FIG. 4, the query and the rephrased version of the query include different numbers of words. For example, the decoder NN 124 may continue to output words for the rephrased version of the query until the decoder NN 124 predicts an end of sequence token as a word for the rephrased version of the query, or until the rephrased version of the query includes a number of words which equals a threshold number of words. In such cases, a size of the rephrased version of the query (which is for example equal to a number of words in the rephrased version of the query) may not be fixed or set a priori (and may differ from the number of words in the query). Instead, the words of the rephrased version of the query may be generated without artificially restricting the number of words of the rephrased version of the query. However, in some instances, the query and the rephrased version of the query may consist of the same number of words as each other.

After generation of the rephrased version of the query, it may be determined that a meaning of the rephrased version of the query is substantially the same as a meaning of the query. This may be determined for example by performing NLU on the query and the rephrased version of the query. Alternatively, user feedback may be used to determine that the query and the rephrased version of the query have substantially the same meaning as each other. The query and the rephrased version of the query may be considered to have substantially the same meaning as each other where an answer to the rephrased version of the query is the same as the answer to the initial query.

The second data representing the rephrased version of the query may be sent to a query-answering system. The second data may be in any suitable format, such as text data or a structured format, to simplify processing by the query-answering system. An answer to the rephrased version of the query may subsequently be received, or may be sent to a different system than that used for generating the rephrased version of the query.

An example of generating a context vector is shown schematically in FIG. 6 ((in this example, the first context vector, $c_1$, described with reference to FIG. 4). Generation of the context vector also generates an attention vector (in this example, the first attention vector, $a_1$, described with reference to FIG. 4). However, in some cases, an attention vector may be generated without generating a context vector (or vice versa). As can be seen from FIG. 6, the first context vector, $c_1$, and the first attention vector, $a_1$, are each generated using input both from the encoder NN 118 and the decoder NN 124. In this example, an attention mechanism is used to generate the first context vector, $c_1$, and the first attention vector, $a_1$.

Figure 6:
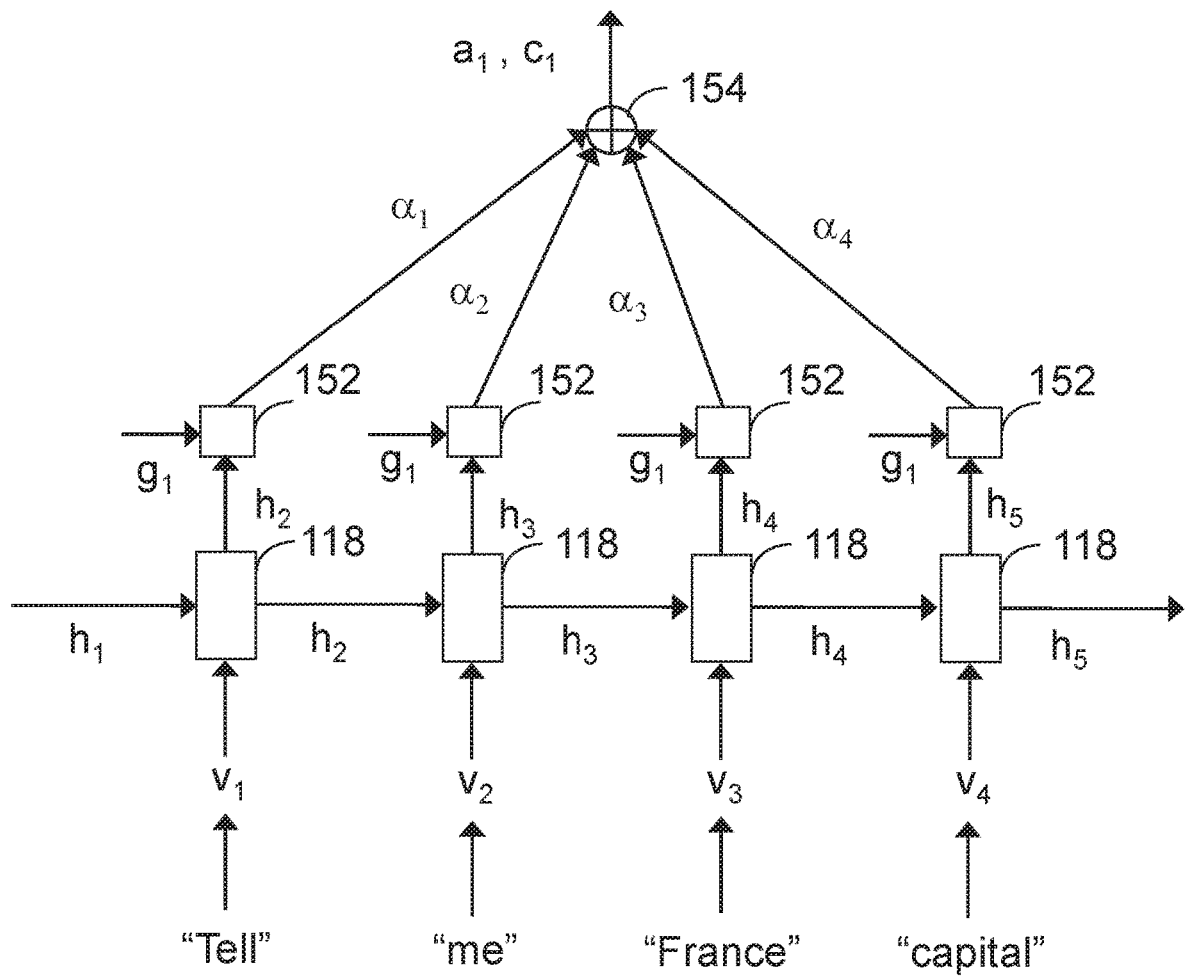
FIG. 6 illustrates schematically the generation of a context vector according to examples.

FIG. 6, includes processing 152 a hidden state of the decoder NN 124 with at least one hidden state of the encoder NN 118. In this example, the first hidden state, $g_1$, of the decoder NN 124 is processed with at least one hidden state of the encoder NN 118. The first hidden state, $g_1$, of the decoder NN 124 is used in this instance because the first context vector, $c_1$, and the first attention vector, $a_1$, to be generated are intended to capture, respectively, a context of a first element of the rephrased version of the query, and an alignment between a first element of the rephrased version of the query (which in this case is the null element) and the query. Hence, in this instance, the first attention vector, $a_1$, captures this alignment at a first time (after processing the null element using the decoder NN 124 and before processing other elements of the rephrased version of the query). Similarly, the first context vector, $c_1$, captures this context at the first time.

In this example, the first hidden state, $g_1$, of the decoder NN 124 is processed 152 with each of a plurality of hidden states, $h_2, h_3, h_4, h_5$, of the encoder NN 118. Various different functions may be used to process 152 the first hidden state, $g_1$, of the decoder NN 124 with a hidden state of the encoder NN 118. In the example of FIG. 6, an attention value may be calculated by processing 152 the first hidden state, $g_1$, of the decoder NN 124 with a hidden state of the encoder NN 118. These attention values are labelled in FIG. 6 as $\alpha_1, \alpha_2, \alpha_3, \alpha_4$, for processing of the first hidden state, $g_1$, of the decoder NN 124 with hidden states, $h_2, h_3, h_4, h_5$, of the encoder NN 118, respectively.

As an example, processing 152 the first hidden state, $g_1$, of the decoder NN 124 with a hidden state of the encoder NN 118 (such as the second hidden state, $h_2$, of the encoder NN 118) to generate the first attention value $\alpha_1$ may include calculating a dot product between the first hidden state, $g_1$, of the decoder NN 124 and the hidden state of the encoder NN 118. However, in other examples, other functions may be used to calculate attention values. As an example, an alternative function that may be used for the calculation of an attention value $\alpha_i$ (representing an attention value based on processing of the first hidden state, $g_1$, of the decoder NN 124 with a hidden state, $h_{i+1}$, of the encoder NN 118) is as follows:

$$\alpha_1 = V \tanh(W_1 h_i + W_2 g_1)$$

where $V$, $W_1$ and $W_2$ are parameters associated with the NN system 114 (which are for example generated during training of the NN system 114). It is to be appreciated that these are merely examples, and different functions may be used in other examples.

Although not shown in this example, it is to be appreciated that, in other examples, the attention values may be normalized. For example, the attention values may be normalized, e.g. using the softmax function, so that a sum of the attention values is equal to 1. In this example, the attention values are normalized at item 132 of FIG. 4, as part of the normalization of the combined score vector. Hence, normalization of the attention values during generation of the attention vector may be omitted in this example.

In examples such as FIG. 6, the attention value $\alpha_i$ for a given hidden state, $h_{i+1}$, of the encoder NN 118 may be considered to correspond to a score associated with a corresponding word of the query. For example, the second hidden state, $h_2$, of the encoder NN 118 may be considered to correspond to the first word ("Tell") of the query, as the first word of the query is processed by the encoder NN 118 to compute the second hidden state, $h_2$, of the encoder NN 118. Hence, in this example, the attention value, $a_1$, for the second hidden state, $h_2$, of the encoder NN 118 may be considered to correspond to a first score associated with the first word of the query (which is for example the first word of the first subset of words). This for example depends on an alignment between the first word of the query and a word to be predicted for the rephrased version of the query. This in turn may be considered to depend on a context surrounding the first word in the query and a context surrounding the word to be predicted for the rephrased version of the query. Hence, the attention values generated as shown in FIG. 6 may be used to determine which word is to be selected as the next word of the rephrased version of the query.

In FIG. 6, the attention values $\alpha_1, \alpha_2, \alpha_3, \alpha_4$ are combined at item 154 to generate the first attention vector $a_1$. In this example, combining the attention values includes assigning a respective attention value to a respective element of the first attention vector $a_1$. The first attention vector $a_1$ in FIG. 6 includes four elements, as follows:

$$a_1 = \begin{pmatrix} \alpha_1 \\ \alpha_2 \\ \alpha_3 \\ \alpha_4 \end{pmatrix}$$

Mapping the attention values to elements of an attention vector in this way allows individual attention values to be retrieved straightforwardly from the attention vector, while retaining an association between an attention value and a corresponding word of the query. Hence, in this case, attention value $\alpha_n$ is mapped to the nth element of the first attention vector, $a_1$, and corresponds to the nth word of the query. On this basis, after concatenating the first attention vector, $a_1$, and the first score vector, $r_1$, and generation of the first probability vector, $p_1$, it may be easily identified which probability value corresponds to which word of the set of words (and whether it corresponds to a word of the query, which is for example a word of the first subset of words, or a word of the second subset of words).

In the example of FIG. 6, the combining of the attention values $\alpha_1$, $\alpha_2$, $\alpha_3$, $\alpha_4$ at item 154 is also used to generate the first context vector $c_1$ (although in other examples, the attention vector and context vector may be generated separately, for example sequentially, or the generation of one of the attention vector or the context vector may be omitted). The first context vector $c_1$ may be used to indicate to the decoder NN 124 which of the words of the query to pay more attention to. The first context vector $c_1$ may be generated by performing a weighted sum of the hidden states of the encoder NN 118. This may be represented mathematically as:

$$c_i = \sum_{j=1}^{T} \alpha_{ij} h_j$$

where $c_i$ is the ith context vector (for the ith word of the rephrased version of the query), T is the number of words in the query, $\alpha_{ij}$ is the attention vector calculated based on the ith word of the rephrased version of the query and the jth word of the query, and $h_j$ is the jth hidden state of the encoder NN 118.

As will be appreciated, a method as described with reference to FIGS. 2 to 6 may be used repeatedly for different queries. For example, the query of FIGS. 2 to 6 may be a first query and the set of words (from which words of the rephrased version of the first query are selected) may be a first set of words. In such cases, third data representative of a second query, different from the first query may be received. A representation of the second query may be generated using the encoder neural network and the third data, for example using the methods of FIGS. 2 to 6. Fourth data representative of a rephrased version of the second query may be generated (for example as described with reference to FIGS. 2 to 6) using the decoder neural network and the representation of the second query. In such cases, generating the fourth data may include selecting words for the rephrased version of the second query from a second set of words comprising a third subset of words comprising words of the second query and the second subset of words. Hence, the second subset of words may be considered to be a common subset of words, which may be used repeatedly for different queries. In other words, the second subset of words may be independent of the query. Conversely, the set of words as a whole may depend on the query to be rephrased, as the set of words includes words of the query (the first subset of words for the first query and the second subset of words for the second query).

Figure 7:
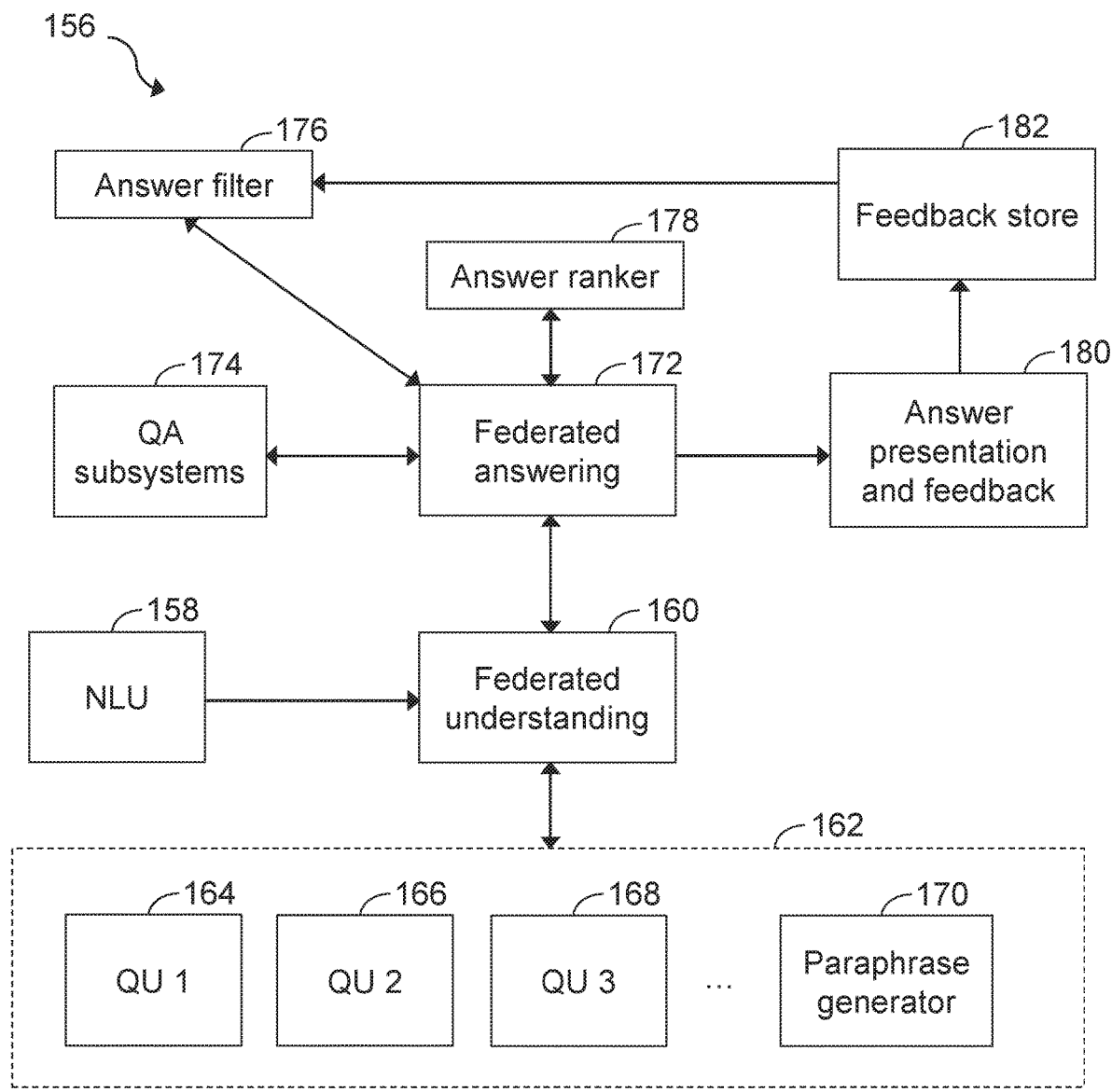
FIG. 7 illustrates schematically components of a system for use with the methods described herein.

FIG. 7 illustrates schematically components of a system 156 for use with the methods described herein. The system includes an NLU coordinator 158. The NLU coordinator 158 sends a query to a federated understanding system 160. A federated system is for example any system which includes a plurality of different subsystems each providing an alternative approach to performing the same function or a similar function. Such a function may for example be NLU or query-answering. The federated understanding system interfaces with a plurality of different NLU subsystems 162, each arranged to perform NLU of an input, such as the query. NLU may involve relation extraction (which for example relates to determining relationships or other facts between entities) in addition to named entity recognition (which for example involves identifying entities, including named entities) and named entity resolution (sometimes referred to as named entity linking, which generally involves resolving ambiguities that may be present where there are two entities that relate to different concepts or objects but are nevertheless represented by the same word).

In the example of FIG. 7, the NLU subsystems 162 include first, second and third NLU subsystems 164, 166, 168 as well as a paraphrase generator 170 (which may be referred to as a paraphrasing system), which may be considered to perform a form of NLU by providing an alternative phrasing of an input query (which may be considered to be a rephrasing of the query). Internal components of an example paraphrase generator are shown in more detail in FIG. 8. Example NLU subsystems are rule-based systems, knowledge base querying systems and information retrieval based systems, although other systems or methods may be used for NLU instead.

A rule-based system may include hardcoded answers to common queries. Such a rule-based system may additionally or alternatively involve the application of certain rules to a query to identify its suitability for being answered by a hardcoded answer. Such rules may for example include regular expressions (commonly referred to as "regexes"), which are a sequence of characters. This sequence of characters may be searched for in the query (for example using a string searching algorithm), and removed or replaced with other characters. The sequence of characters which may be searched for by a rule-based system (and whether they are removed or replaced when they are found in a query, and what they are replaced by) may be handcrafted based on common expressions that may occur in typical questions.

A knowledge base querying system may be used to obtain a representation of the query as a query over a knowledge base. For example, the query may be represented in the form of entities and relations, which correspond to entities and relations that are present in a knowledge base to be used for answering the query (as discussed further below).

An information retrieval based system for example uses full-text or context-based indexing of text data from a collection of different sources, such as documents, data structures such as databases, or metadata associated with documents. For example, an information retrieval based system may search the collection of sources for an exact or partial match between text content of the collection of sources and some or all of the query (which may also be in the form of text). The collection of sources may for example include information sources such as encyclopedia articles, news articles or scientific papers.

The plurality of NLU subsystems 162 may be implemented as web services. As an example, an NLU subsystem may consume an input in the form of text, which for example represents natural language. The input may also include metadata, such as audio (if the query is received as an utterance from a user), a location indicating where the input originated, device-dependent environmental features indicative of an environment of the device which captured the input and which may affect the input, user-dependent features (which may help remove ambiguity, for example where a word has two different meanings), or conversational context.

The federated understanding system 160 of FIG. 7 interfaces with a federated answering system 172. The federated answering system 172 provides an input, which may be received as an understanding provided by the federated understanding system 160 or from another system or systems of an NLP system, for example as text data, to a plurality of query-answering subsystems 174, which are illustrated further in FIG. 9. The federated answering system 172 and the plurality of query-answering subsystems 174 may be considered to correspond to a query-answering system as described herein. Such a query-answering system tries to provide an answer or answers to a query (although this may not be possible, if the query-answering subsystems 174 do not include an answer to this query).

Answers obtained by the federated answering system 172 are sent to an answer filter 176. The answer filter 176 for example performs whitelisting and/or blacklisting.

The answers remaining after filtering by the answer filter 176 are then processed by an answer ranker 178. The answer ranker 178 may be used to rank between multiple candidate answers to a query or a rephrased version of a query to choose which answer to provide to a user (or to choose not to return an answer to a query, if all the answers are for example determined to be low-quality). The answer ranker 178 for example consumes a query-answer pair (where the query may be the original query or a rephrased version of the query) and returns a suitability score, indicative of a suitability of a particular query-answer pair. The answer ranker 178 may instead or additionally receive other data, such as metadata, for example relating to the original query (where the original query has been rephrased). This may then be used by the answer ranker 178 to ascertain a quality of the rephrasing of the query. Among the other data the answer ranker 178 may receive may be metadata summarizing the paths or routes taken to understand and answer the query, such as which of the NLU subsystems 162 were used to understand the query or which of the query-answering subsystems 174 were used to provide the answer to the query. The answer ranker 178 may be updated periodically. For example, where the answer ranker 178 uses a machine learning based model, the model may be retrained every so often, which may be at regular intervals, based on queries and feedback that have been received.

Once a suitable answer has been identified by the answer ranker 178, the answer may be presented to the user, using an answer presentation and feedback system 180. This system may for example be a speech-controlled device, in which the answer is returned as audio. Alternatively, this system may be a different device, such as a computer device, with the answer returned as audio or in a different format, such as text.

Feedback received in response to a request for feedback may then be stored in a feedback store 182. This feedback may then be used to update the answer filter 176. The feedback store 182 for example stores information about suitable or satisfactory rephrased versions of a query for a given query. This information (which e.g. may be include a blacklist and/or a whitelist) may be stored in an efficient format, such as a raw form (for example as a hash map) or in an efficient probabilistic compressed representation (such as a Bloom filter). In such cases, the answer filter 176 may perform whitelisting and/or blacklisting by comparing a query-rephrased query pair against feedback data stored in the feedback store 182, such as a blacklist or whitelist. For example, if a query-rephrased query pair is found to be present in a blacklist, this pair may be discarded, as it may be considered that the rephrased version of the query does not adequately capture a meaning of the query or that the query-answering system lacks an answer (or a satisfactory answer) to the rephrased version of the query. Conversely, such a pair may be retained if it is found to be present in a whitelist. In some cases, the answer filter 176 may compute a constraint, such as a distance measure between a query-rephrased query pair, to determine whether a query and a rephrased version of the query are sufficiently similar that the rephrased version of the query is likely to accurately capture a meaning of the query. A suitable distance measure is the Jaccard distance. If the Jaccard distance between a query and a rephrased version of the query is less than a predetermined threshold distance (such as a distance of 0.7), the rephrased version of the query may be considered to be an accurate rephrasing of the query. The rephrased version of the query may then be retained for further processing.

Figure 8:
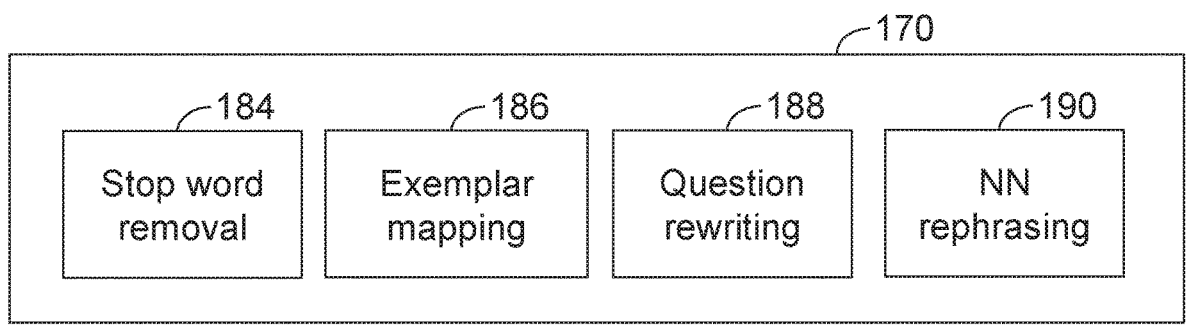
FIG. 8 illustrates schematically components of a paraphrasing system according to examples.

FIG. 8 shows schematically internal components of the paraphrase generator 170 of FIG. 7, which may be considered to be an example of a paraphrasing system. The paraphrase generator 170 in this example includes various different paraphrasing subsystems. In this case, the paraphrase generator 170 includes a stop word removal system 186 which for example transforms queries by removing stop words. Typically, stop words are considered to be common words, such as "a", "or", "and" and "but". Various techniques may be used to remove stop words, such as term frequency-inverse document frequency (TF-IDF) techniques. TF-IDF typically represents a value that aims to represents the importance of a term (which is for example a word) to a document in a collection of documents. The collection of documents may be external to the query-answering system or may include previous queries submitted to the query-answering system. For example, the collection of documents may be a collection of all previous queries submitted to or answered by the query-answering system. Alternatively, the collection of documents may be a corpus of all previous non-answered queries that the query-answering system lacked an answer to or lacked a satisfactory answer to. In this context, TF-IDF techniques may be used to derive a value that represents the importance of words of the text data to the text data. Data representative of words that are determined to be less important, such as beneath a predetermined threshold, may be removed from the text data.

The paraphrase generator 170 includes an exemplar mapping system 186, which for example performs shallow-parse-exemplar-mapping. Shallow-parse-exemplar-mapping for example involves recognizing an entity and a relation in the query, e.g. using a semantic parser to perform a shallow parse of the query. Shallow parsing for example involves identification of constituent parts of a phrase such as nouns, verbs and adjectives, and then identifying more complex components that for example reflect semantic relations between the constituent parts. In this way, entities and relations present in the query may be identified. Entities are for example a concept or object, and may include named entities, which are for example real-world concepts or objects (which may be abstract or exist physically) that can be denoted with a proper noun. Relations for example represent relationships or facts relating to entities. A semantic parser (or other machine learning model for identifying entities and relations in a query) may be implemented as a combination of an entity tagger, to identify entities in the query, and an intent classifier, to identify the interactions or relationships between the identified entities. An entity tagger may for example use a linear chain conditional random field (CRF) or a recurrent neural network. An intent classifier may be a feedforward neural network. Upon identification of entities and relations in the query, a generic query is generated. The generic query may be considered to be an exemplar query, which for example represents a generalized version of a query. For example, an exemplar query may include entity classes and relations rather than specific entities and relations. In this way, the exemplar mapping system 186 for example rephrases a query as a generalized version of the query.

The paraphrase generator 170 of FIG. 8 also includes a question rewriting system 188. The question rewriting system 188 may be similar to or the same as a whitelist. For example, the question rewriting system 188 may be used to identify particular pairings of a query and satisfactory rephrased version of the query, allowing the query to be replaced by the satisfactory rephrased version of the query. The question rewriting system 188 may be updated using feedback obtained from users. However, in other examples, the question rewriting system 188 may include pairings that are generated in a different way. For example, a human operative may populate the question rewriting system 188 with high quality pairings. Typically, the question rewriting system 188 is populated and updated offline. For example, the question rewriting system 188 may be updated periodically, such as every 24 hours, rather than being updated in real time or otherwise on-the-fly, as new queries are received. This may improve the stability of the system and reduce system outages in which the system is unavailable for processing of new queries due to internal updates. For example, feedback data may be accumulated over time, such as over a rolling window of time periods. This feedback data may be consolidated and used to update the question rewriting system 188. Similarly, this feedback data may also be used to update a blacklist, which may form part of an answer filter. In some cases, different versions of the question rewriting system 188 may be provided to different user samples or different utterance samples. This may be used to gain further insight into the interaction between different users and the question rewriting system 188, which may be used to further refine the question rewriting system 188.

In FIG. 8, the paraphrase generator 170 includes a NN rephrasing system 190, which is for example the same as the NN system 114 described with reference to FIGS. 2 to 6. The NN system 114 may be used to implement the methods described herein, using an encoder NN and a decoder NN, to generate a rephrased version of a query that includes words selected from a set of words including a first subset of words including words of the query and a second subset of words including words absent from the query.

Machine learning models, which may be used for the shallow-parse-exemplar-mapping system 186 and the NN rephrasing system 190, may be updated, for example by retraining, over time, such as at a regular interval. For example, these models may be retrained or tuned based on feedback on queries received and processed since a previous update. These models may be retrained offline (for example, without forming part of an active system which is available or accessible to users) and then redeployed periodically.

The paraphrase generator 170 may be used to generate what may be considered to be partial understandings of a query during NLU. Each partial understanding may correspond to a different respective rephrased version of the query. These rephrased versions of the query may be considered "partial" understandings in that these rephrased versions of the query may not necessarily accurately or satisfactorily capture the underlying meaning of the query.

The paraphrase generator 170 of FIG. 8 is merely an example, though. In other examples, a paraphrasing system may omit some of these paraphrasing subsystems or may include different paraphrasing subsystems instead of or as well as those shown in FIG. 8. Furthermore, in some cases, the paraphrasing system may include solely one model for obtaining a rephrased version of a query, such as one of the paraphrasing subsystems, rather than a plurality of different paraphrasing subsystems. For example, the system of FIG. 7 may use solely a NN rephrasing system 190 such as the NN system 114 of FIGS. 2 to 6 to generate a rephrased version of the query.

Figure 9:
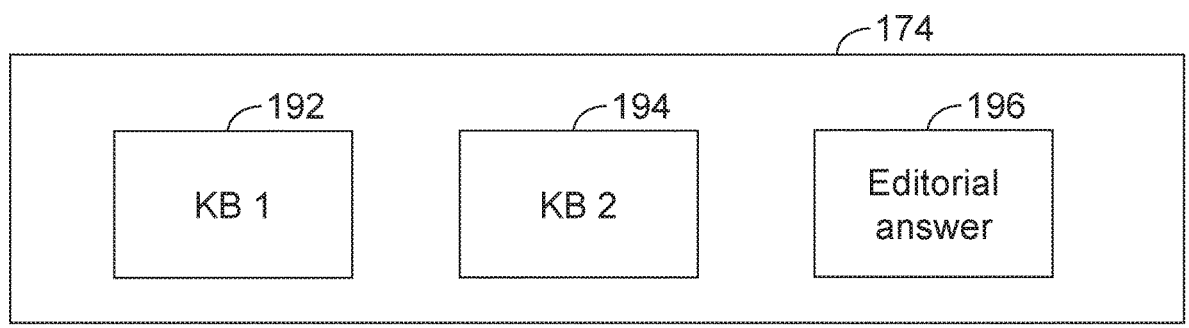
FIG. 9 illustrates schematically components of a query-answering system according to examples.

FIG. 9 shows schematically internal components of the query answering subsystems 174 of FIG. 7. In this example, the query answering subsystems 174 include a first knowledge base 192, a second knowledge base 194 and an editorial answering system 196, which for example provides narrative answers to queries. The first and second knowledge bases 192, 194 may for example include different facts than each other. For example, the first and second knowledge bases 192, 194 may have been populated differently from each other, for example using different input data sources.

A knowledge base (sometimes referred to as a knowledge database) typically includes numerous facts, usually in the form of fact triples (sometimes referred to simply as a "triple"). A fact triple generally corresponds to a particular subject-predicate-object expression, which can be used in computer-based question answering. For example, a knowledge base that includes facts that express the relationship between a subject and a predicate allows a question based on two of the subject-predicate-object fact triple to be answered using the knowledge base. Such fact triples can be expressed in the form of predicate (subject, object), where the predicate is a relationship or other relation and the subject and object may be considered to be entities that participate in that relationship. A knowledge base may be in the form of a graph, with a node of the graph corresponding with an entity (which may be identified in a query using NLU) and an edge of the graph corresponding with a relation (which may also be identified using NLU). An entity of a knowledge base may be associated with entity text, which denotes or represents the entity associated with the entity text. The entity text data may for example be used to search for entities within the knowledge base, for example using a string matching technique. This may therefore allow answers to a query to be located in the knowledge base. For example, if a query includes two components of a fact triple, which may be expressed in the form of predicate (subject, object), the knowledge base can be queried to locate, for example, entities corresponding to the subject and the object, connected by a relationship corresponding to the predicate. The answer to the query can then be returned, for example by returning the missing component of the fact.

In other examples, answers may be obtained in other ways from a knowledge base. For example, a knowledge base may be queried using a template representative of a query and identifying portions of the knowledge database that either exactly match the template or that match the template to a certain statistical degree. The template may be obtained from natural language (such as natural language representative of the query) using NLP techniques that would be familiar to the skilled person. In cases in which the knowledge base is structured as a graph, with a plurality of nodes and a plurality of edges, a template representing a query may also be in the form of a graph. As explained above, a subject or object of a fact triple may correspond with a node of the graph and a predicate of a fact triple may correspond with an edge of the graph. In such cases, a template graph representing the query may include a first node corresponding with a subject, a second node corresponding with an object and an edge connecting the first node to the second node, which represents the predicate. An answer to such a query may be retrieved from the knowledge base by determining a portion of the graph representing the knowledge base (for example including two nodes and an edge connecting the two nodes) that corresponds with or otherwise matches the template graph, either exactly or to a certain level of statistical certainty.

An editorial answering system such as the editorial answering system 196 of FIG. 9 may for example be used to return narrative or other long-form answers to a given query. The editorial answering system 196 may involve sending the query to a human analyst, for example, and requesting an answer from the analyst. It is to be appreciated, though, that in some cases the role of the analyst may be automated, for example using machine learning. It is to be appreciated that FIG. 9 is merely an example, though, and other query-answering systems may include more, fewer or different query-answering subsystems than those shown in FIG. 9.

Figure 10:
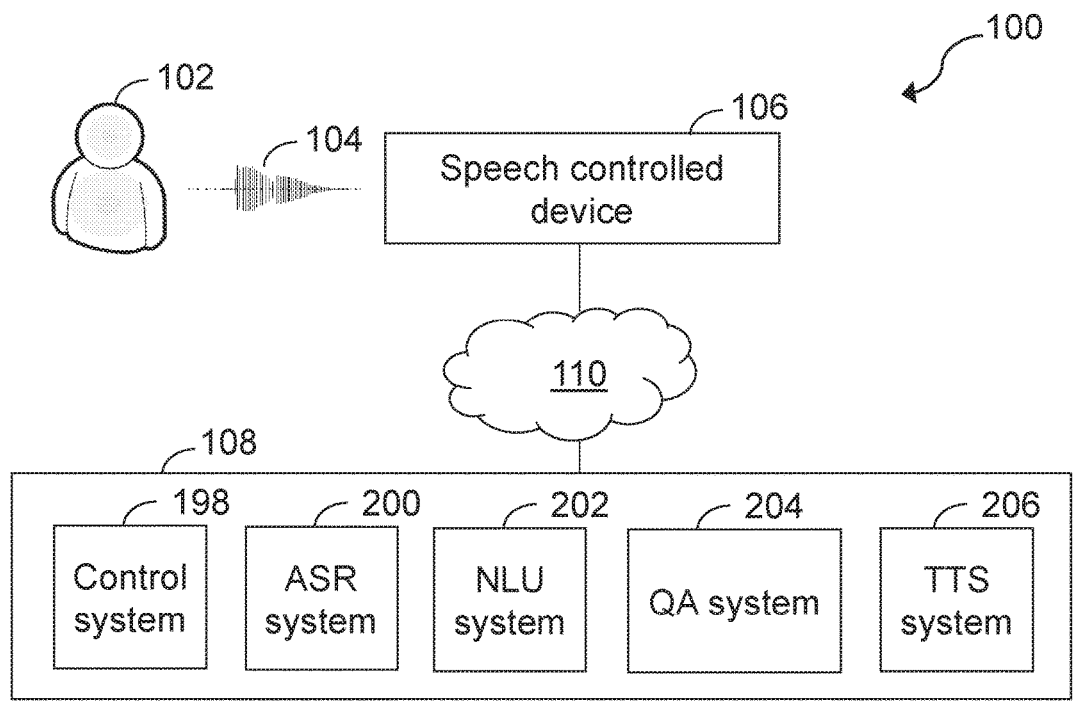
FIG. 10 illustrates the example system of FIG. 1 in more detail.

FIG. 10 shows in more detail the example system 100 of FIG. 1. The system of FIG. 10 includes the speech processing system 108 of FIG. 1, which is shown in more detail in FIG. 10, although it is to be appreciated that the methods described herein may be performed using systems arrange to receive inputs in other formats than speech, such as systems arranged to receive text input rather than voice input (sometimes referred to as spoken input). As will be appreciated, the system of FIG. 10 is merely illustrative; the methods described herein may be performed using a number of different devices and computer systems, including, for example, general-purpose computing systems, server-client computing systems, mainframe computing systems, telephone computing systems, laptop computers, cellular phones, personal digital assistants (PDAs), tablet computers, far field devices such as the Amazon Echo, automobile computer systems, robots or other mobile devices such as wearable devices like smart watches.

For example, the methods described herein may be performed using a system including at least one processor and at least one memory comprising computer program instructions. The at least one processor and the at least one memory may be located in the same computer device, or the at least one processor and the at least one memory may be located in different devices, such as in a distributed computer system, such as a cloud computer system.

The at least one processor may be a central processing unit (CPU) for processing data and computer-readable instructions. In other examples, the at least one processor may be a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computer devices, e.g., a combination of a DSP and a microprocessor, a plurality of microprocessors, one or more microprocessors in conjunction with a DSP core, or any other such configuration. The at least one processor may be coupled, using one or more buses, to read information from or write information to one or more memories, such as the at least one memory. The at least one processor may additionally, or in the alternative, contain memory, such as processor registers.

The at least one memory may include volatile random access memory (RAM), non-volatile read only memory (ROM), and/or other types of memory. In other examples, the at least one memory may be a data storage component of a computer device, for storing data and instructions. The data storage component may include one or more storage types such as magnetic storage, optical storage or solid-state storage. Computer instructions for processing by the at least one processor for operating the computer device and its various components in accordance with the methods described herein may be executed by the at least one processor and stored in the at least one memory. Some or all of the executable instructions may be embedded in hardware or firmware in addition to or instead of software. The methods described herein may be implemented in various combinations of software, firmware, and/or hardware, for example.

In FIG. 10, the speech controlled device 106 is arranged to capture the spoken utterance 104 of the user 102 via an audio capture device such as a microphone or a microphone array. The audio capture device may be integrated into or may be separate from the speech controlled device 106. The speech controlled device 106 may also include at least one speaker, for example for providing audio output for responding to a user in response to the user's utterance 104, for example based on NLU of the user's utterance 104, to provide an appropriate response to the user's utterance, such as an answer to a question asked by the user. The speech controlled device 106 may be part of a computer device, such as a device with computational capability such as a laptop or personal computer; a mobile or a cellular phone. For example, the speech controlled device 106 may be or form part of various different electronic devices such as a mobile phone (sometimes referred to as a cellular phone or cell phone), a far field device such as the Amazon Echo, a tablet, an automobile, a robot, or a wearable device such as a smart watch.

The speech controlled device 106 transmits the utterance 104 over the network 110 for receipt by other components of the system of FIG. 10. The utterance 104 may be processed by the speech controlled device 106, or other components accessible to the speech controlled device 106, for example to reduce noise or improve a quality of the captured utterance before the utterance 104 is transmitted. The network 110 may be any suitable data network, for example a computer network such as the Internet, a local area network, a wide area network, a telecommunications network, a wired network, a wireless network, or some other type of network, or may include a series of networks such as these.

In the example of FIG. 10, the utterance 104 is transferred from the speech controlled device 106 to a control system 198 of the speech processing system 108. The control system 198 then sends the utterance 104 to an automatic speech recognition (ASR) system 200 of the speech processing system 108 for converting the utterance 104, which may be in the form of audio data to text data. The audio data may be in the form of a digitized representation of an audio waveform of the utterance 104.

Audio data may be processed in real time or may be saved and processed at a later time. Audio data may be input to the ASR system 200 which then interprets the utterance 104 represented by the audio data based on the similarity between the utterance 104 and models known to or accessible to the ASR system 200. For example, the ASR system 200 may compare the input audio data with models for sounds (e.g., subword units or phonemes) and sequences of sounds to identify words that match the sequence of sounds spoken in the utterance 104. The different ways an utterance may be interpreted may each be assigned a probability or a recognition score representing the likelihood that a particular set of words matches those spoken in the utterance 104. The recognition score may be based on a number of factors including, for example, the similarity of the sound in the utterance 104 to models for language sounds (e.g., an acoustic model), and the likelihood that a particular word which matches the sounds would be included in the sentence at the specific location (e.g., using a language or grammar model). Based on the considered factors and the assigned recognition score, the ASR system 200 may output the most likely words recognized in the audio data The ASR system 200 may also output multiple alternative recognized words in the form of a lattice or an N-best list.

The ASR system 200 of FIG. 10 includes an echo cancellation filter, an acoustic front end (AFE), a speech recognition engine, and speech storage. The echo cancellation filter for example compares audio that is output by the user 102 of the speech controlled device 106 with sound picked up by the audio capture device of the speech controlled device 106, and removes the output sound from the captured sound in real time. Echo cancellation is commonly used by cellular telephones and other telephones operating as speaker phones, and facilitates the ASR process by removing a component of captured sounds that can interfere with speech recognition.

The AFE transforms the audio data after echo cancellation into data for processing by the speech recognition engine. The speech recognition engine compares the speech recognition data with the acoustic, language, and other data models and information stored in the speech storage for recognizing the speech contained in the original audio data. The AFE and speech recognition engine may include their own controller(s)/processor(s) and memory or they may use at least one processor and the at least one memory of the speech processing system 108 (which may be accessible to other components of the speech processing system 108), for example. Similarly, the instructions for operating the AFE and speech recognition engine may be located within the ASR system 200, within at least one memory and/or storage of the speech processing system 108, or within an external device.

The AFE within the ASR system 200 may divide the digitized audio data into frames, with each frame representing a time interval, for example 10 milliseconds (ms). During that frame the AFE determines a set of values, a feature vector, representing the features/qualities of the utterance portion within the frame. Feature vectors may contain a varying number of values and represent different qualities of the audio data within the frame. Audio qualities of points within a frame may be stored into feature vectors. Feature vectors may be streamed or combined into a matrix that represents a time period of the spoken utterance 104.

These feature vector matrices may then be passed to the speech recognition engine for processing. A number of approaches may be used by the ASR system 200 and AFE to process the audio data. Such approaches may include using mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine attempts to match received feature vectors to language phonemes and words such as may be known in storage or at least one memory accessible to the ASR system 200. The speech recognition engine may compute recognition scores for the feature vectors based on acoustic information and language information. The acoustic information may be used to calculate an acoustic score representing a likelihood that the intended sound represented by a group of feature vectors match a language phoneme. The language information may be used to adjust the acoustic score by considering what sounds and/or words are used in context with each other, thereby improving the likelihood that the ASR system 200 outputs speech results that make sense grammatically.

The output of the ASR system 200 in FIG. 10 is in the form of text data, representative of text. Text data may be in any suitable format for representing text, such as a string, a vector or an array of vectors, such as an array of feature vectors. For example, each feature vector may be considered to correspond to a separate word of the utterance 104, such that the utterance 104 may be represented as the array of feature vectors. Alternatively, the utterance 104 may be represented using solely one vector, which may be formed by concatenating feature vectors representative of individual words of the query. It is to be appreciated that the format of text data may be modified as the text data is transferred between different components of a system such as that of FIG. 10, and may differ depending on the components of the system. For example, where the methods described herein are employed in a system in which text data corresponding to a query is submitted by a user, the text data representative of the query may be in the form of a string. If, however, the methods described herein are employed within a speech processing system such as that of FIG. 10, the text data may be in the form of a vector.

Following ASR processing, the text data generated by the ASR system 200 of FIG. 10 is sent by the ASR system 200, for example via the control system 198, to an NLU system 202 of the speech processing system 108 for further speech processing. The NLU system 202 may also receive textual input from another source, such as via an I/O component of the speech processing system 108. The NLU system 202 may include a dedicated NLU engine, processor, memory, storage, named entity recognition (NER) system and/or other components, and/or may use components otherwise available on or accessible to the speech processing system 108. The NLU system 202 may for example be or include a federated understanding system, such as that of FIG. 7 and may therefore include subsystems such as the NLU subsystems 162 of FIG. 7. As explained above with reference to FIG. 7, the NLU system 202 for example takes the text data output from the ASR system 200 and attempts to make a semantic interpretation of the text data. That is, the NLU system 202 may determine the meaning behind the text, for example based on the individual words, and then may execute a command based on the meaning or pass a command to a downstream application for execution. The NLU processing is based on the models and programming available to the NLU system 202. Such models may be grammar based, rule based, or constructed in a different manner.

NER processing typically involves processing a sequence of words in a textual input, recognizing and identifying specific important words, called entities, of an NLU textual input and assigning a tag or label to those words, which may be performed by a NER system of the NLU system 202. The tag or label is a classification of the associated word that may assist eventually implementing the user's utterance 104. Certain parts of speech (such as conjunctions that join phrases, clauses and sentences) may be considered less important, thus not considered an entity and may not receive a tag.

As part of determining what (if any) tag to apply to each word, the NER system may consider textual context information, such as what words come before or after the word being processed or what other words appear in the sentence. These factors to consider in processing, called features, are indicated to the NER system through feature vectors. Each word in the sequence of words is associated with a corresponding feature vector. The feature vector is a long data structure which indicates what circumstances apply to the particular word. For example, an NLU system 202 may have access to an index of thousands of words that are known to the system. The feature vector may include an entry for all or a subset of the words in the index to indicate whether the selected word of the index is the actual word being processed, whether a word in the index is located in the same sentence as the word being processed, or whether a word in the index is directly before or after the word being processed. The information in the feature vector may then influence the NER processing in its attempt to tag the text.

A feature vector may include components that are binary features that may be effectively "yes or no" indicators or may include non-binary values. Other information about the text may also be indicated to the NER system through entries in the feature vector. The individual feature vectors for specific words are typically sparse, meaning that only a small subset of the feature vector entries have a non-zero value. The information represented by the feature vector entries are typically defined when training the models used by the NER system. When performing NER, the NER system thus may process the feature vector associated with the word, rather than processing the word itself.

Generally, models used for NER may be trained with feature vectors such as those associated with words during NER processing, with the feature vectors capturing the word identity as well as other information that may be pertinent to that word (e.g. contextual and other information as mentioned above). Known models that may be used in NER include maximum entropy models (also known as log-linear models), such as Maximum Entropy Markov Models (MEMMs) or Conditional Random Fields (CRFs). The underlying model may apply weights to certain of the data/feature-components associated with the word and included in the feature vector. The weights may determine the relative importance of each of the feature vector components. Feature vector weights may be applied during training where the underlying NLU model essentially provides the set of weights that are trained on a certain set of data/words and those weights indicate how important each of those feature vector components are. Thus the NER model internally has weight vectors that have the same dimension as the actual feature vectors and when the NER system is predicting the labels, it may calculate an inner product (or dot product) of the feature vector and the weight vector so that each individual feature of the feature vector is properly weighted.

The further processing of the text data performed by the NLU system 202 therefore attempts to make a semantic understanding of the text data, for example to identify an intent of the text data. In this way, the NLU system 202 may be used to identify that the text data (which may for example be first text data as described above) represents a query. In this way, the NLU system 202 may therefore identify understandings of the query.

In parallel or after receiving a representation of the query from the NLU system 202, the query (or the representation of the query) may be sent to the query-answering system 204 in an attempt to obtain an answer to the query represented by the utterance 104. The query-answering system 204 may for example be a federated answering system such as that of FIG. 7. The query-answering system 204 may for example include the query-answering subsystems 174, the answer filter 176 and the answer ranker 178 of FIG. 7. If the query-answering system lacks an answer to the query (or lacks a satisfactory answer to the query), a rephrased version of the query may be obtained, for example from the NLU system 202, such as from a paraphrasing system of the NLU system 202, or from another system or systems. An answer to the rephrased version of the query may then be sought as described above.

Once an answer to the query or the rephrased version of the query is received or otherwise obtained by the query-answering system 204, or after an indication from the NLU system 202 that the intent of the utterance is to ask a query, text data representative of an answer, may be converted to audio data for output to the user 102, for example using a text to speech system 206 of the speech processing system 108. The text to speech system 206 of FIG. 10 may include a speech synthesis system for generating the audio data from the text data representative of the answer, which may be a separate system or component or integrated with other systems or components of the system of FIG. 10.

In this and other examples, the speech processing system 108 may be a network-distributed service, which may be referred to as a "cloud" service. In other words, for example, the speech processing system 108 are accessible to the speech controlled device 106 via the network 110 but are not stored directly on or as part of the speech controlled device 106. The speech processing system 108 is instead stored in at least one remote device, such as a computer device that is remote from the speech controlled device 106. In other examples, though, the speech controlled device 106 may comprise some or all of the speech processing system 108.

Figure 11:
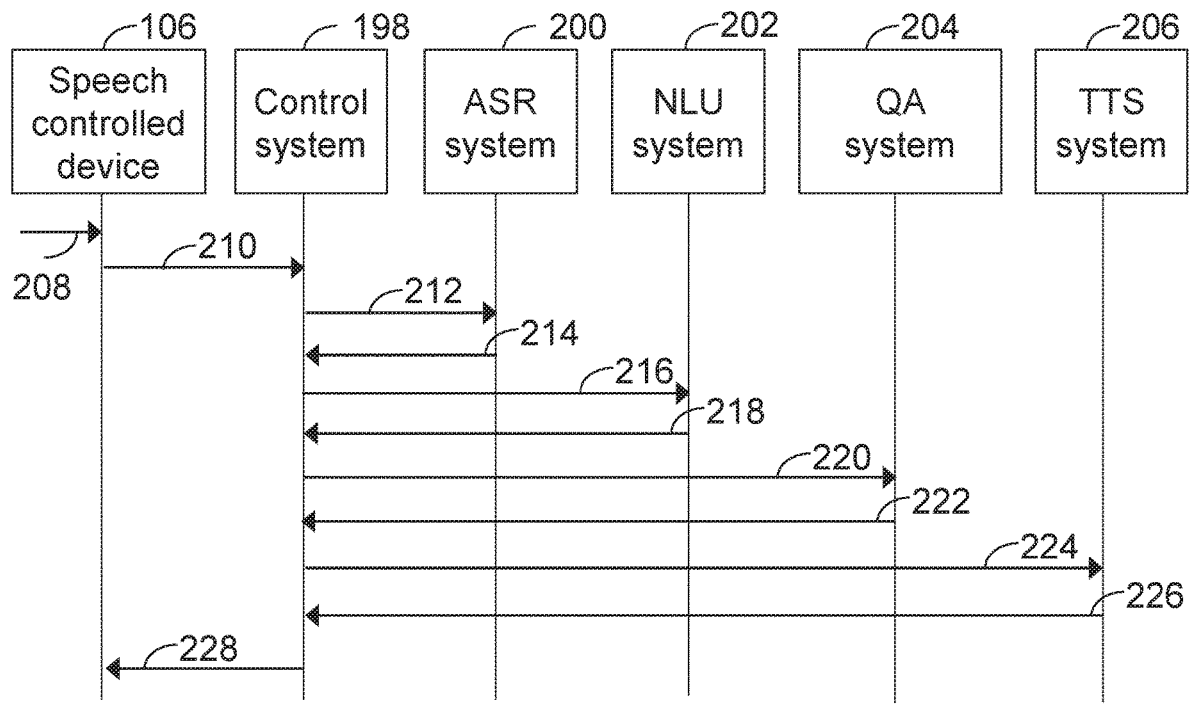
FIG. 11 is a sequence diagram showing an example of communications between components of the example system of FIG. 10.

FIG. 11 is a sequence diagram showing an example of communications between components of the example system of FIG. 10. The speech controlled device 106 receives 208 what may be referred to as a wake word and an utterance 104. A wake word is for example a command that may be used to activate the speech controlled device 106 from a standby mode. Recognition of the wake word may be performed by comparing words received by the speech controlled device 106 to a list of command words or by using limited NLU processing to determine that an intent of the user 104 is to activate the speech controlled device 106. In other examples, though, the user 102 may activate the speech controlled device 106 from the standby mode via other input than a wake word, for example by pressing a button of the speech controlled device 106.

The utterance 104 represents a user input to the speech controlled device 106 and in this example represents a query. The utterance 104 is sent 210 to the control system 198, which may be referred to as an orchestrator, as it orchestrates or coordinates the sending of data and/or commands to other components, such as other components of the speech processing system 108. The control system 198 sends 212 audio data representing the utterance 104 to the ASR system 200. The ASR system 200 converts the audio data to text data as described above with reference to FIG. 10. The ASR system 200 may also detect an endpoint of the utterance 104 and send a message to the speech controlled device 106 to close an audio data stream. This message may be sent via the control system 198.

The ASR system 200 sends 214 the text data to the control system 200. The control system 200 then sends 216 the text data to the NLU system 202 to classify the intent of the text represented by the text data.

After processing of the text data by the NLU system 202, text data output by the NLU system 202 is sent 218 to the control system 198. The control system 198 may then send one or more directives to perform various actions on the speech controlled device 106, such as to play audio data, open a microphone of the speech controlled device 106, pause media that is currently being played by the speech controlled device 106, adjust a volume of audio output by the speech controlled device 106 or other actions, depending on the intent identified by the NLU system 202. The control system 198 may also send further instructions based on the text data. In the example of FIG. 11, the NLU system 202 identifies that the text data represents a query and the control system 198 sends 220 the query to the query-answering system 204. In other examples, though, the query may be sent 220 to the query-answering system 204 before the NLU system 202 has identified that the intent of the user is to ask a query, which may be before the output is sent 218 from the NLU system 202 to the control system 198. The query is sent 220 to the query-answering system 204 along with a command to retrieve an answer to the query, using the query-answering system 204. Further details of receiving or otherwise obtaining an answer to a query from a query-answering system such as that of FIG. 11 are provided above, and may include obtaining a rephrased version of the query and receiving an answer to the rephrased version of the query rather than to the query itself.

Once an answer has been received, the query-answering system 204 returns 222, in this example, text data representing text including the answer to the control system 198. The control system 198 then sends 224 an instruction to the text to speech (TTS) system 206 to generate audio data using text to speech processing and the third text dat. The TTS system returns 226 the audio data to the control system 198, which then sends 228 the audio data to the speech controlled device 106. The speech controlled device 106 can then play output audio based on the audio data to the user 102.

The examples herein are to be understood as illustrative examples. Further examples are envisaged.

In examples described herein, a rephrased version of a query is generated. However, in further examples, a plurality of different rephrased versions of a query may be generated. For example, a so-called beam search method may be used during decoding, for example using the decoder NN 124 of FIGS. 2 to 6. In such cases, rather than merely selecting the word with the highest probability value as a subsequent word for the rephrased version of the query, a plurality of hypotheses (e.g. k hypotheses, where k is an integer) for the subsequent word may be retained and used as subsequent inputs to the decoder NN 124. Subsequently, a further k hypotheses (e.g. corresponding to the k words with the highest probability values) may be selected as yet further inputs to the decoder NN 124. This process may continue so as to generate a total of k predictions for the rephrased version of the query. As will be appreciated, in some cases, the number of hypotheses retained may differ at different times, e.g. depending on a probability value associated with the hypotheses. In this way, a larger number of hypotheses may be discarded where each of these hypotheses has a relatively low probability value. Conversely, a larger number of hypotheses may be retained where each of these hypotheses has a relatively high probability value. Use of such a method for example allows errors at a given time to be rectified at a subsequent time, which may improve the accuracy of rephrasing.

Further examples relate to training a NN system such as the NN system 114 of FIG. 2. The NN system 114 may be trained using supervised training data, for example using cross entropy loss with teacher forcing (although this is merely an example). Cross entropy for example represents an average number of bits for identifying an event drawn from a set, which may be modelled by a true probability distribution p and a predicted probability distribution q, using a coding scheme to optimize for the predicted probability distribution q rather than the true probability distribution p. The cross entropy can be used to form a loss function, which may be minimized during training of the NN system 114. In this way, the conditional probability that the NN system 114 generates a given output, in response to a given input, can be optimized. Teacher forcing typically involves using an output from a prior time as an input, to improve the efficiency of training an NN system 114 involving RNNs. Such an output is for example an actual or expected output from a training dataset at a given time, rather than an output generated by the NN system 114, and may therefore represent a true output (e.g. the correct word at a given time). For example, if the decoder NN 124 outputs "a" as a predicted output at a given time, but the correct output is "France", the correct output (in this case "France") may be input to the decoder NN 124 at the next time, rather than the actual output (in this case "a"). This can therefore reduce a time taken to train the NN system 114, and reduce a tendency of an output to deviate from the correct output during training.

In examples, the NN system 114 may be trained (which may be referred to as initialization) without supervised training data. For example, the NN system 114 may be trained as an autoencoder. In other words, the NN system 114 may be trained to predict the query, rather than training the NN system 114 to predict a rephrased version of the query. In such cases, a plurality of samples may be generated using an output of the decoder NN 124 during training, using a similar method to beam search as discussed above. In this way, a plurality of training samples may be generated from a single input. These training samples may then be used as further training inputs, during training of the NN system 114 as an autoencoder.

Training of the NN system 114 using supervised training data or as an autoencoder may be used to generate a baseline NN system 114, which may be further refined using feedback relating to rephrased versions of a query, such as the feedback described with reference to FIG. 7. For example, feedback scores can be generated for a rephrased version of a query based on reinforcement learning loss, which can be used to further refine the NN system 114. Reinforcement learning for example involves optimizing an action taken by an agent in an environment so as to maximize what may be considered to be a cumulative reward. This approach may be used to optimize the NN system 114 to maximize recall on a particular domain, such as a particular set of query-rephrased query pairs (such as a set of query-rephrased query pairs that have received positive feedback from users, or a set of query-rephrased query pairs for which an answer or a satisfactory answer exists in the query-answering system). Such a set of query-rephrased query pairs may be stored efficiently, e.g. using a hashmap or a Bloom filter, for example in the feedback store 182 described with reference to FIG. 7. In this way, training of the NN system 114 may continue, so that the ability of the NN system 114 to predict rephrased queries associated with a particular domain (such as rephrased queries that accurately capture a meaning of a query or for which an answer exists in the query-answering system) is improved. For example, a small positive reward may be generated for generating a rephrased version of the query that is answerable by the query-answering system. Conversely, a small negative reward may be generated for generating a rephrased version of a query that the query-answering system is unable to answer satisfactorily. The so-called REINFORCE algorithm may be used for reinforcement learning loss, although other algorithms may be used in other examples.

Further examples are envisaged, which include combinations of features of the originally filed claims, as indicated in the following table, which lists various envisaged claim dependencies for the claims originally filed with this application. Hence, in addition to the description above, this table gives basis in the specification for general examples having a combination of features of claims filed herewith:

| Claim as Originally Filed | Envisaged Claim Dependencies |
| --- | --- |
| 1 | — |
| 2 | 1 |
| 3 | 2 |
| 4 | — |
| 5 | 4 |
| 6 | 5 |
| 7 | Any one of claims 4 to 6 |
| 8 | Any one of claims 4 to 7 |
| 9 | Any one of claims 4 to 8 |
| 10 | 9 |
| 11 | Any one of claims 4 to 10 |
| 12 | Any one of claims 4 to 11 |
| 13 | Any one of claims 4 to 12 |
| 14 | Any one of claims 4 to 13 |
| 15 | Any one of claims 4 to 14 |
| 16 | Any one of claims 4 to 15 |
| 17 | Any one of claims 4 to 16 |
| 18 | — |
| 19 | 18 |
| 20 | 18, 19 |

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method comprising:
capturing a spoken utterance comprising a first query related to a first topic;
generating first text data representing the spoken utterance;
sending the first text data to a query-answering system;
receiving an indication from the query-answering system that the query-answering system lacks an answer to the first query;
generating a vector representation of the first query using an encoder long short term memory (LSTM) neural network and the first text data;
generating second text data representative of a rephrased version of the first query using a decoder LSTM neural network and the vector representation of the first query, the generating the second text data comprising selecting words for the rephrased version of the first query from a set of words comprising:
a first subset of words comprising words of the first query; and
a second subset of words comprising words absent from the first query, the second subset of words independent of the first topic;
sending the second text data to the query-answering system;
receiving answer text data from the query-answering system, the answer text data representative of an answer to the rephrased version of the first query;
generating audio data using text to speech processing and the answer text data, the audio data representative of the answer text data;
receiving third text data representative of a second query related to a second topic; and
using the second subset of words and a third subset of words comprising words of the second query to generate fourth text data representative of a rephrased version of the second query.

2. The method according to claim 1, wherein the generating the second text data comprises:
generating, using an attention mechanism, a first attention vector comprising a first element associated with a first word of the first subset of words;
generating, using the decoder LSTM neural network, a first score vector comprising a second element associated with a second word of the second subset of words;
concatenating the first attention vector and the first score vector to generate a combined score vector;
generating, using the combined score vector and a softmax function, a probability vector comprising:
a first probability value indicative of a first probability that the first word is a subsequent word in the rephrased version of the first query; and
a second probability value indicative of a second probability that the second word is the subsequent word in the rephrased version of the first query; and
at least one of:
determining that a first magnitude of the first probability value is greater than a second magnitude of the second probability value to select the first word as the subsequent word for the rephrased version of the first query; or
determining that a second magnitude of the first probability value is greater than a first magnitude of the second probability value to select the second word as the subsequent word for the rephrased version of the first query.

3. The method according to claim 2, wherein the attention mechanism uses a current hidden state of the decoder LSTM neural network and at least one hidden state of the encoder LSTM neural network to generate the first score vector.

4. A method comprising:
receiving first data representative of first words of a first query related to a first topic;
generating a representation of the first query using an encoder neural network and the first data, the first query having a first meaning;
generating second data representative of second words of a rephrased version of the first query using a decoder neural network and the representation of the first query, the rephrased version of the first query having a second meaning at least similar to the first meaning, the second words selected from:
a first subset of words comprising at least some of the first words of the first query; and
a second subset of words comprising third words absent from the first query, the second subset of words independent of the first topic; and
outputting data, representative of an answer to the rephrased version of the first query, for answering the first query.

5. The method according to claim 4, comprising, to select the second words for the rephrased version of the first query:

generating a first score associated with a first word of the first subset of words, using the encoder neural network, the decoder neural network and the representation of the first query;

generating a second score associated with a second word of the second subset of words, using the decoder neural network and the representation of the first query; and selecting at least one of the first word or the second word for the rephrased version of the first query based on at least one of the first score or the second score.

6. The method according to claim 5, comprising:
before the selecting the at least one of the first word or the second word, normalizing:
the first score to generate a normalized first score; and
the second score to generate a normalized second score, such that a sum of a set of normalized scores comprising the normalized first score and the normalized second score corresponds to a predetermined value; and
at least one of:
determining that a first magnitude of the normalized first score is greater than a second magnitude of the normalized second score to select the first word for the rephrased version of the first query; or
determining that the second magnitude of the normalized second score is greater than the first magnitude of the normalized first score to select the second word for the rephrased version of the first query.

7. The method according to claim 4, comprising, before the generating the representation of the first query, and the generating the second data representative of second words of the rephrased version of the first query:
sending the first data to a query-answering system; and
receiving an indication from the query-answering system that the query-answering system lacks a satisfactory answer to the first query.

8. The method according to claim 4, comprising, to select the second words for the rephrased version of the first query: generating, using an attention mechanism, a first score associated with a first word of the first subset of words.

9. The method according to claim 4, wherein:
the generating the representation of the first query using the encoder neural network comprises processing a first word of the first query and a first hidden state of the encoder neural network, using the encoder neural network, to compute a second hidden state of the encoder neural network; and
the generating second data representative of second words of the rephrased version of the first query comprises processing a hidden state of the decoder neural network with the second hidden state of the encoder neural network to generate a first score associated with a first word of the first subset of words.

10. The method according to claim 9, wherein the processing the hidden state of the decoder neural network with the second hidden state of the encoder neural network comprises calculating a dot product between the hidden state of the decoder neural network and the second hidden state of the encoder neural network.

11. The method according to claim 4, comprising, to select the second words for the rephrased version of the first query:
receiving the representation of the first query and a start of sequence token as an input to the decoder neural network;

computing a hidden state of the decoder neural network in response to the input, wherein the hidden state is representable as a hidden state vector with a first dimensionality;
changing a dimensionality of the hidden state vector to generate a score vector with a second dimensionality equal to a number of the third words in the second subset of words; and
using an element of the score vector as a second score associated with a second word of the second subset of words.

12. The method according to claim 4, comprising, to select the second words for the rephrased version of the first query:
receiving, as an input to the decoder neural network:
a first hidden state of the decoder neural network obtained based on processing of a start of sequence token of the rephrased version of the first query; and
a first word of the rephrased version of the first query;
computing a second hidden state of the decoder neural network in response to the input, wherein the second hidden state is representable as a hidden state vector with a first dimensionality;
changing a dimensionality of the hidden state vector to generate a score vector with a second dimensionality equal to a number of the third words in the second subset of words; and
using an element of the score vector as a second score associated with a second word of the second subset of words.

13. The method according to claim 4, wherein the generating the second data comprises copying a portion of the first data representative of a word in the first query to generate a portion of the second data representative of the word in the rephrased version of the first query.

14. The method according to claim 4, comprising:
determining a language of the first query, and
to select the second words for the rephrased version of the first query, selecting the second words which are in the language of the first query such that the first query and the rephrased version of the first query are in the same language.

15. The method according to claim 4, wherein the method comprises:
receiving third data representative of a second query, different from the first query;
generating a representation of the second query using the encoder neural network and the third data;
generating fourth data representative of fourth words of the rephrased version of the second query using the decoder neural network and the representation of the second query, the rephrased version of the second query comprising the fourth words selected from:
a third subset of words comprising at least some of fifth words of the second query; and
the second subset of words.

16. The method according to claim 4, comprising determining that the first meaning is substantially the same as the second meaning.

17. The method according to claim 4, comprising sending the second data to a query-answering system.

18. A system comprising:
at least one processor;
at least one memory comprising computer program instructions,
the at least one memory and the computer program instructions operable to, with the at least one processor:

receive first data representative of first words of a first query related to a first topic;

generate a representation of the first query using an encoder neural network and the first data, the first query having a first meaning;

generate second data representative of second words of a rephrased version of the first query using a decoder neural network and the representation of the first query, the rephrased version of the first query having a second meaning at least similar to the first meaning, the second words selected from:
- a first subset of words comprising at least some of the first words of the first query; and
- a second subset of words comprising third words absent from the first query, the second subset of words independent of the first topic; and output data, representative of an answer to the rephrased version of the first query, for answering the first query.

19. The system according to claim 18, wherein the at least one memory and the computer program instructions are operable to, with the at least one processor, select the words for the rephrased version of the first query using a method comprising:
- generating a first score associated with a first word of the first subset of words, using the encoder neural network, the decoder neural network and the representation of the first query;
- generating a second score associated with a second word of the second subset of words, using the decoder neural network and the representation of the first query; and
- selecting at least one of the first word or the second word for the rephrased version of the first query based on at least one of the first score or the second score.

20. The method according to claim 4, wherein the encoder neural network is an encoder long short term memory (LSTM) and the decoder neural network is a decoder LSTM neural network.

* * * * *